United States Patent [19]
Fritze et al.

[11] Patent Number: 5,225,889
[45] Date of Patent: Jul. 6, 1993

[54] LASER GYRO DITHER DRIVE

[76] Inventors: Keith R. Fritze, 4921 Sparrow Rd., Minnetonka, Minn. 55345; Joseph E. Killpatrick, 2901 32nd Ave. NE., Minneapolis, Minn. 55418; Dale F. Berndt, 335 Pineview La. North, Plymouth, Minn. 55441

[21] Appl. No.: 805,124

[22] Filed: Dec. 11, 1991

[51] Int. Cl.[5] ............................................. G01C 19/70
[52] U.S. Cl. ...................................... 356/350; 372/94
[58] Field of Search ........................... 356/350; 372/94

[56] References Cited
U.S. PATENT DOCUMENTS
4,529,311 7/1985 Morgan et al. .................. 356/350

Primary Examiner—Vincent P. McGraw

[57] ABSTRACT

A direct digital dither drive for a laser gyro dither motor including a digital microcomputer which controls the dithering of a laser gyro to prevent lock in of the laser beams. The digital drive senses a dither position and schedules internal A/D conversions using an A/D conversion arbitration scheme. The period frequency and location of the minimum and maximum drive are determined using the microcontroller. Accurate dither drive is accomplished using a digital analog feedback system which compensates for real time changes in dither pickoff and dither drive components.

64 Claims, 18 Drawing Sheets

LASER GYRO DITHER DRIVE

This invention relates generally to laser gyros and, more particularly, to a method and apparatus for direct digital drive of a laser gyro dither motor using a microcontroller in a closed loop system.

RELATED APPLICATIONS

The following applications are related hereto, are assigned to the same assignee as this application, been filed on the same date as this application and incorporated herein by reference. LASER GYRO DITHER STRIPPER.

BACKGROUND OF THE INVENTION

Laser angular rate sensors, often also called laser gyros, are well known. One example of a laser angular rate sensor is U.S. Pat. No. 4,751,718 issued to Hanse, et al., which is incorporated herein by reference thereto. Present day laser angular rate sensors include a thermally and mechanically stable laser block having a plurality of formed cavities for enclosing a gap. Mirrors are placed at the extremities of the cavities for reflecting laser beams and providing an optical closed-looped path.

Associated with such sensors is an undesirable phenomenon called lock-in which has been recognized for some time in the prior art. In the prior art, the lock-in phenomenon has been addressed by rotationally oscillating or dithering such sensors. The rotational oscillation is typically provided by a dither motor.

Dither motors of the prior art usually have a suspension system which includes, for example, an outer rim, a central hub member and a plurality of dither motor reeds which project radially from the hub member and are connected between the hub member and the rim. Conventionally, a set of piezoelectric elements which serve as an actuator is connected to the suspension system. When actuated through the application of an electrical signal to the piezoelectric elements, the suspension system operates as a dither motor which causes the block of the sensor to oscillate angularly at the natural mechanical resonant frequency of the suspension system. This dither motion is superimposed upon the inertial rotation of the sensor in inertial space. Such dither motors may be used in connection with a single laser gyro, or to dither multiple laser gyros. The prior art includes various approaches to recover inertial rotation data free from dither effects.

SUMMARY OF THE INVENTION

A direct digital dither drive apparatus for a laser gyro is provided by the present invention. The direct digital drive apparatus of the invention comprises a low pass filter having at least three poles, a high pass filter having at least two poles, an output for providing a filtered signal and an input connected to a pulse width modulated digital drive signal. The direct digital drive further comprises an amplifier for amplifying the filtered signal from the low pass filter wherein the amplifier is coupled at an input to the output of the low pass filter and a means for driving the dither motor in response to the amplified signal is coupled to the amplifier output, wherein the driving means includes an active pull-up means including means for providing a dead band operating characteristic so as to substantially eliminate current spikes on the power supply signal and provide a highly efficient driver that consumes low power.

It is one object of the invention to provide a dither motor driving means which provides an output in the range of +150 to −150 volts in response to a pulse width modulation input ranging from 0% to 100% duty cycle.

It is a further object of the invention to provide an improved dither drive circuit that consumes power only during transitions of the pulse width modulated signal input.

It is yet another object of the invention to provide an improved dither drive circuit that consumes a small amount of power when the capacitive driving load of the dither motor reaches steady state.

Other objects, features and advantages of the present invention will become apparent to those skilled in the art through the Description of the Preferred Embodiment, Claims, and drawings herein wherein like numerals refer to like elements.

DESCRIPTION OF THE PREFERRED EMBODIMENT

Figure 1:
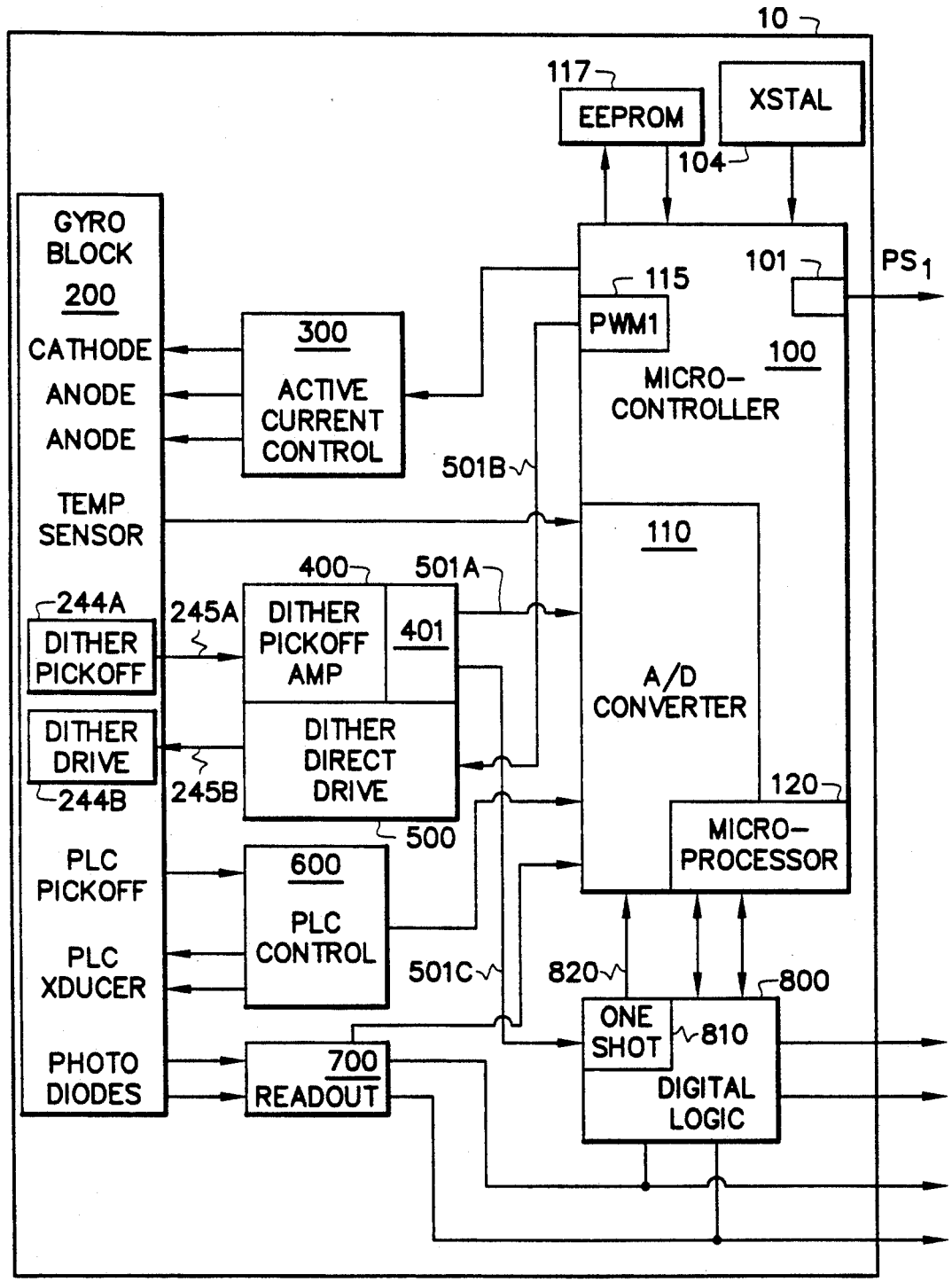
FIG. 1 shows a block diagram of one embodiment of a laser gyro employing the novel features of the present invention.

Referring now to FIG. 1 which shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principals of the invention and not by way of limitation. Laser gyro 10 includes a controller 100, a laser gyro block 200, an active current control 300, dither pickoff amplifier 400, direct digital dither drive 500, a path length control (PLC) device 600, a readout 700, and digital logic 800.

The direct digital dither drive of the invention is implemented in one example embodiment with a microcontroller serving as controller 100. The dither drive is a closed loop system comprising a dither pickoff 244A, dither pickoff amplifier circuit 400, A/D converter 110, controller 100, PWMI 115 output line 501B, direct dither drive 500 and dither motor 244B. The A/D converter 110 may be integral to the controller and may advantageously be a 10 - bit A/D converter. The 10 - bit A/D converter provides ten bits of accuracy for the dither stripper method and apparatus discussed in more detail in applicants' copending application "LASER GYRO DITHER STRIPPER". The controller 100 may also advantageously include a microprocessor 120. The controller 100 has a processor 120 core with hardware peripheral support that provides highly reliable, cost effective and highly integrated control functions.

Briefly, in operation the RLG Block position represented by a pickoff voltage 245A is first amplified by dither pickoff amplifier 400. The amplified dither pickoff signal 501A is sent to the A/D converter 110 and also to a comparator (not shown) which in turn generates a square wave 501C which is sent to a one shot 810 to limit the maximum frequency of the interrupt. The one shot 810 is periodically reset at approximately the rate of 1000 Hz. The output of the one shot interrupts the controller at positive edge zero crossings. The method of dither pickoff and drive is shown in more detail in FIG. 5. Based on the zero crossing of the laser block position the microprocessor calculates the dither period and predicts sample times. The dither drive wave form shown in more detail in FIG. 6 is then sampled by the A/D converter 110 at the negative and positive peaks of the dither signal sine wave. This sampling process also provides a 90 degree phase shift which is required to drive the dither motor 244B. After sampling, the A/D value is compared to the desired gain adjusted displacement reference, the quantity is multiplied by a gain factor, random noise is added and the signal is sent to the pulse width modulator 115. The random noise could advantageously be gaussian. The displacement reference is corrected by a gain adjustment of the dither stripper to correct for any pickoff scale factor variations. The reference displacement may be further adjusted at periodic intervals by the laser gyro direct dither drive system. The operation of the invention is discussed in more detail below.

In one embodiment of the invention a microcontroller 100 is comprised of the Intel 80C196KC Microcontroller. The microcontroller 100 contains three pulse width modulators which in this embodiment of the invention are used for various control functions. The pulse width modulator PWMI 115 is used for controlling the dither drive circuit. A number of software modules are involved in the initialization and control of the microcontroller 100. The software programs are run by the microprocessor 120 contained within the microcontroller 100. A PWM signal of 100% corresponds to a output of −150 volts, a PWM signal of 50% corresponds to an output of 0 volts, and a PWM signal of 0% corresponds to an output of +150 volts.

In one embodiment of the invention the pulse width modulation signal is initially set to a 50% duty cycle. Part of the dither drive circuit utilizes a random noise quantity that is injected into the drive circuit. The dither drive random number generator is initialized at the time the control system for the modular gyro 10 is started.

The dither drive circuit is further initialized by the initialization of system variables. System variables refer to the reference voltages which are used to calculate the actual displacement of the lasing system. In the dither drive circuit a pickoff signal 245A which is an approximation of a sinusoid signal is generated by the dither pickoff. The pickoff signal represents angular displacement. The reference peak angular value is compared against the peak of the sinusoidal pickoff signal and a difference value is obtained which defines the error in the dither drive. The actual reference voltages are then initialized during system powerup. These reference values are stored in EEPROM 102 and represent a conversion from voltage to displacement.

In one embodiment of the invention the dither drive requires 200 milliseconds to initialize. The dither drive is started either simultaneously with the laser or slightly ahead of the laser.

In the embodiment of FIG. 1 there are first and second timers in the microcontroller 100. The first timer is used for sampling functions. The second timer is used for dither drive and dither stripping functions. Both timers have to be synchronized. On board high speed output logic in the microcontroller 100 synchronizes the timers to perform such functions as A/D conversion for the dither stripping operation. The on board high speed input logic captures external events that are occurring in real time and stores the first timer count values in a FIFO register. The microcontroller 100 is thereby able to independently and asynchronously capture external events.

The sample strobe $DS_1$ is provided by the host inertial navigation system. $DS_1$ represents the time at which all the gyro's in the inertial navigation system should be sampled. The sample times need to be anticipated to eliminate modular gyro system latencies The sample strobe $DS_1$ also synchronizes multiple gyro's within the INS.

In this embodiment of the invention the microcontroller 100 has a number of analog inputs that are multiplexed into a single analog to digital converter. The multiple use of a single A to D converter to address more than one analog input signal requires that the sampling be timed properly. The microprocessor system includes a non-volatile memory which in this embodiment is an electrically erasable programmable read only memory ("$E^2$PROM"). Certain system parameters such as dither frequency and dither reference angle are stored in the $E_2$ PROM so that system parameters may be restored after system power on. Those skilled in the art will recognize that other non-volatile memory means can be used.

In the start up initialization sequence the dither drive is pulsed for 20 pulses at the dither frequency with a square wave. For example, in the case where the dither frequency is running at 500 Hz the duty cycle is changed from 0% to 100% for 20 pulses. This cycling supplies energy to the dither motor near its natural resonant frequency to get the dither motor started.

Figure 2:
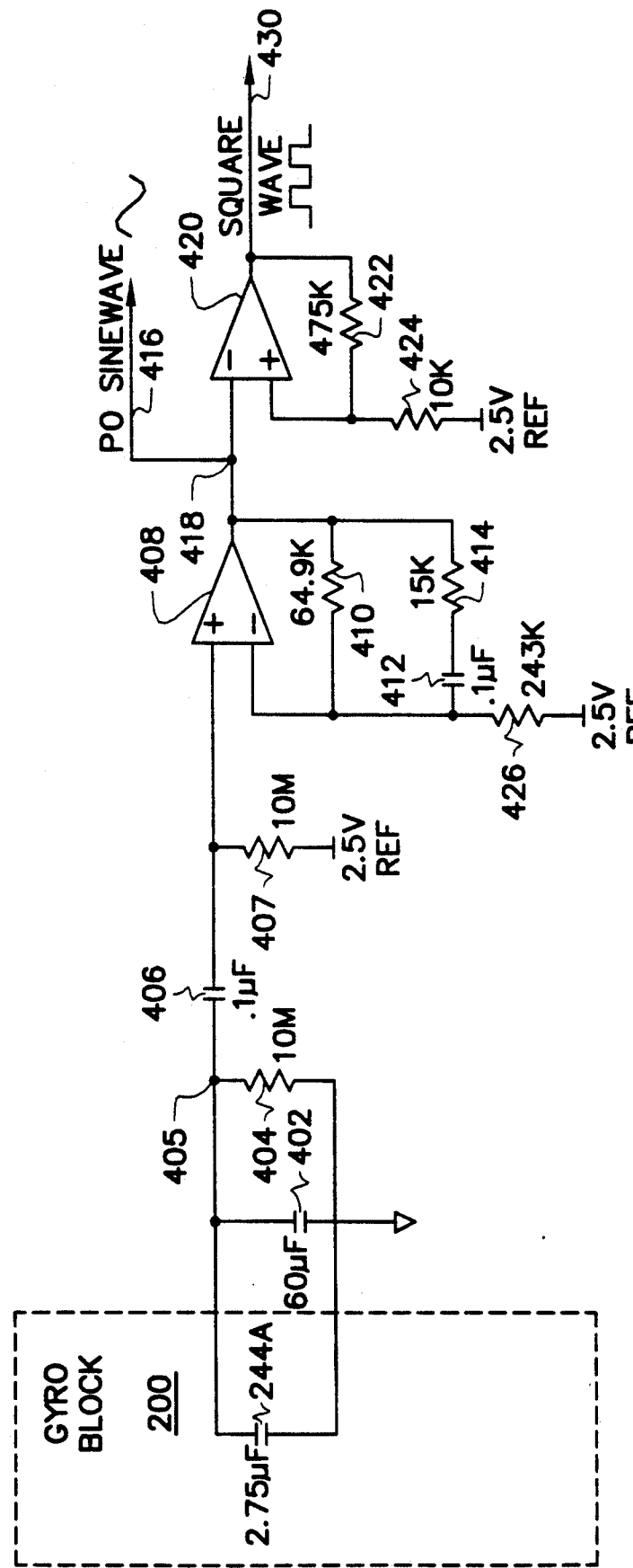
FIG. 2 schematically shows a circuit diagram of one example of a dither pickoff circuit made in accordance with the present invention.

Referring now to FIG. 2 which shows a circuit diagram of one example of a dither pickoff circuit made in accordance with the present invention. In one example, the dither pickoff apparatus comprises at least first, second and third capacitors 402, 406, 412, first through seventh resistors 404, 407, 410, 414, 422, 424, 426 and first and second amplifying means 408, 420. Also shown is dither pickoff 244A which is here symbolized by its inherent capacitance. The first capacitor 402 is connected in parallel with the first resistor 404 at node 405. The dither pickoff is also connected at node 405. The second capacitor 406 is coupled at a first terminal to node 405 and at its other terminal to a non-inverting input of the first amplifier 408. The first amplifier 408, resistors 410, 414 and 426 and capacitor 412 are connected in an arrangement suitable to provide a first gain factor and phase compensation to the dither pickoff circuit. The output 418 of the first amplifier provides a substantially sinusoidal signal 416 which is representative of the dither pickoff to an analog-to-digital input of the microcontroller 100. The second amplifier 420, and resistors 422 and 424 are connected and arranged in a well known manner to provide a substantially square wave signal 430 to the zero crossing input to a one shot 810 in the digital logic 800 and finally to the controller 100. The signal 430 is also representative of the dither pickoff and provides the basic zero crossing detection signal from which the dither period is calculated. The one shot 810 limits the maximum interrupt frequency to 1000 Hz and thereby eliminates false interrupts during start up.

Figure 3:
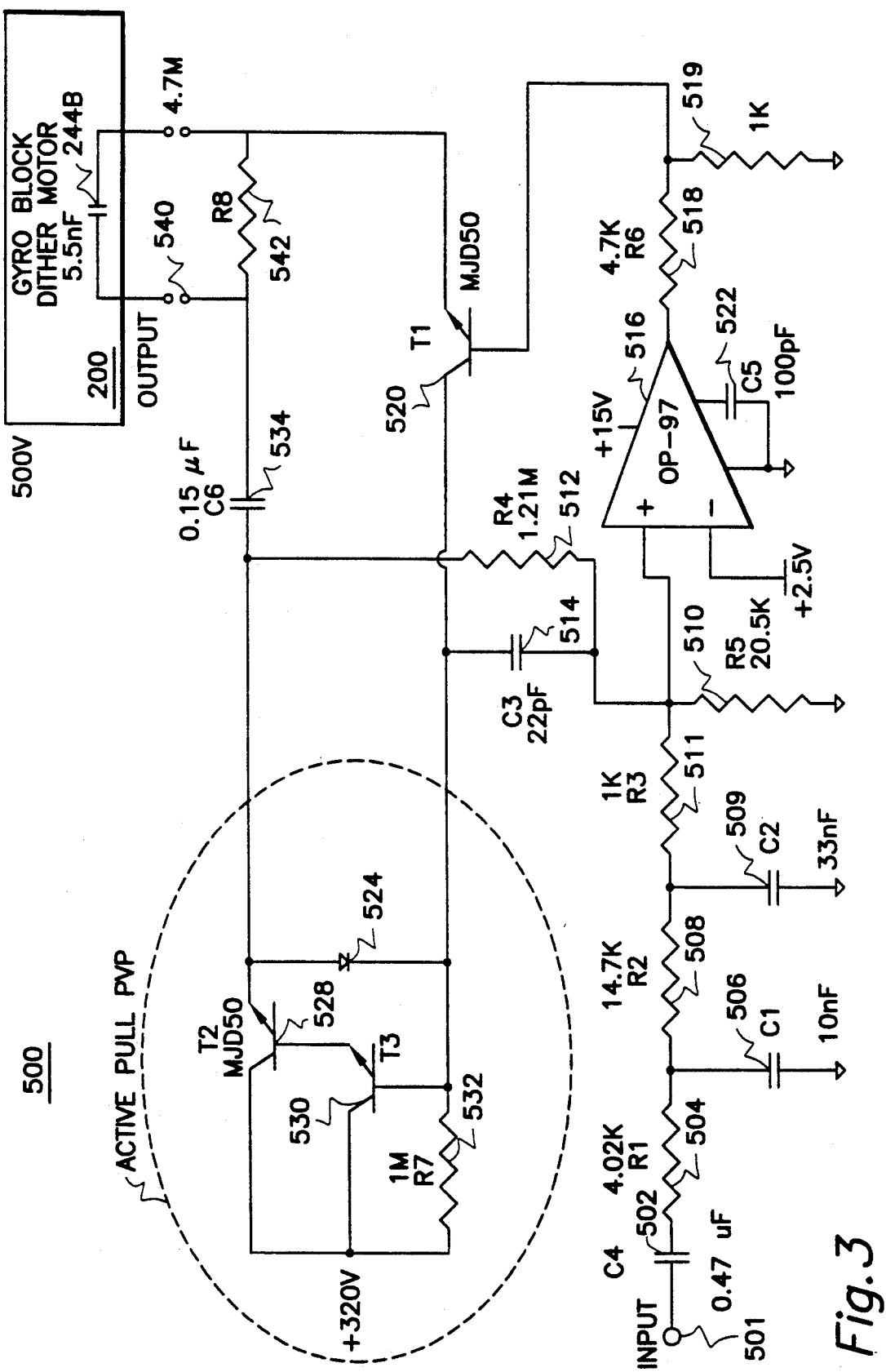
FIG. 3 schematically shows a circuit diagram of one embodiment of a direct digital dither drive circuit as provided by one aspect of the invention.

Now referring to FIG. 3 which shows a circuit diagram of one embodiment of a direct digital dither drive circuit 500 as provided by one aspect of the invention. The direct digital dither drive 500 includes first through sixth capacitors 502, 506, 509, 514, 522 and 534, first through ninth resistors 504, 508, 510, 511, 512, 518, 519, 532 and 542, first through third transistors 520, 528 and 530, diode 524 and amplifier 516.

The first capacitor 502 is connected at a first terminal to a pulse width modulated output 501 from the controller 100. The first capacitor 502 is connected at a second terminal to a first terminal of the first resistor 504. A second terminal of resistor 504 is connected to a first terminal of the second capacitor 506 and the second resistor 508. A second terminal of the resistor 508 is connected to a first terminal of the third resistor 511, the third capacitor 509. A second terminal of the third resistor 511 is connected to a first terminal of the fourth capacitor 514 and the fourth resistor 512 as well as the non-inverting input of amplifier 516 and resistor 510. The output of amplifier 516 is connected to the base of the first transistor 520 through a resistor divider sixth resistor 518 and seventh resistor 519. The fifth capacitor 522 serves as compensation capacitance, increasing phase margins, for amplifier 516. A second terminal of capacitor 514 is connected to the collector of transistor 520 and the base of the third transistor 530 as well as a first terminal of the eighth resistor 532. The collector of the third transistor 530 is connected to a second terminal of the eighth resistor 532 and to a voltage source which may advantageously be about 300 volts in this embodiment of the invention.

The emitter of the third transistor 530 is connected to the base of the second transistor 528 which is also connected at its collector to the voltage source wherein transistors 530 and 528 form a Darlington pair. Diode 524 is a low voltage diode connected in parallel with the Darlington pair and provides a dead band. A second terminal of the fourth resistor 512 is connected to a first terminal of the sixth capacitor 534 and the emitter of the third transistor 528. The capacitor 534 is used to level shift the output of the transistor 528 by 150 volts. The drive signal is AC coupled across 534 to the ninth resistor 542 and to the dither motor 244B in the laser gyro block 200. The resistor 542 provides a DC average of zero volts to the dither motor.

In one embodiment of the invention the first through third transistors may advantageously be NPN transistors of model type MJD50 as available from the Motorola Company of the United States of America. The amplifier may advantageously be a bipolar operational amplifier such as model OP - 97 available from Analog Devices of Massachusetts, USA. Some example component values are illustrated in FIG. 3. The controller 100 may advantageously be an Intel Corporation model 80C19KC microcontroller or equivalent device.

In operation the direct digital dither drive of the invention in this illustrated embodiment is a circuit that directly converts a 5 volt pulse width modulated digital signal from the controller 100 to an analog 300 volt peak-to-peak signal without the use of a transformer. In the past, transformers have proven to be unreliable and require a large core size to avoid saturation when driving the dither motor capacitive load at low frequencies such as about 500 Hz. The pulse width modulated output 501B from the controller 100 may advantageously be a 5 volt pulse width modulated (PWM) signal from the controller with a fixed frequency of about 3.5 KHz which is derived from a 12 Mhz crystal 104 and has a resolution of 512 steps from 0% to 100% PWM. The PWM signal is used only as a means for digital-to-analog conversions and should not be confused with schemes to pulse width modulate at the dither frequency.

In the embodiment of the invention shown in FIG. 3, the direct digital dither drive circuit requires less than 300 mW compared to 750 mW required by transformer designs when driving a 5.5 nF load which is a typical dither motor load with a 500 arcsec peak to peak amplitude and 4 arcsecs RMS random noise. In a typical laser gyro system 4 arcsecs is equivalent to about 1 sigma standard deviation. The efficiency of the circuit apparatus of the present invention is achieved by placing three low pass poles of the transfer function at approximately $(550 Hz \times 23.5 KHz)^{\frac{1}{2}} = 3.6$ KHz which filters the PWM 23.5 KHz signal and yet yields rise and fall times of less than 200 microseconds. Since the power required to drive the capacitive load is proportional to $(V^2 \times f)$ where f is the drive frequency, it is important to filter the PWM signal from the load to conserve power.

The efficiency of the drive is further enhanced by the controller which allows the PWM value to change only twice per dither cycle. There is a first change at the positive peak and a second change at the negative peak of the dither pickoff. The theoretical power required to drive 5.5 nf at 550 Hz at 300 volts (full amplitude) is given by the formula:

$$P = 2f(\frac{1}{2} CV^2) = 272 \text{ mW}.$$

The AC power for one embodiment of the present invention approaches this theoretical limit. The DC bias power is about 81 mW.

Other aspects of the invention include a single power supply design with all NPN transistors and no PNP transistors. The NPN transistors are available in a surface mounted DPAK with the following parameters:

$$V_{CEO} = 400 \text{ VDC and } V_{CB} = 500 \text{ VDC.}$$

Diode 524 provides a dead band so as to prevent transistors 520 and 528 from being turned on simultaneously. The dead band eliminates current spikes on the power supply and further improves efficiency.

The fourth capacitor 514 is connected to the base of transistor 530 rather than the emitter of transistor 528 at the output to enhance stability during the rise and fall transitions. The fifth resistor 512 sets the DC operating point of the output at the emitter of transistor 528 at about +150 volts in one example embodiment of the invention. The output at the emitter of transistor 528 is then level shifted to the final output 540 by coupling capacitor 534. In this arrangement, a 50% duty cycle PWM signal input corresponds to 0 volts output at output 540. A 0% duty cycle PWM signal corresponds to an output at 540 of about +130 volts. A 100% duty cycle PWM signal corresponds to about −130 volts at the output. In the example illustrated, the time to charge the coupling capacitor 534 is about 0.7 seconds during power up of the laser gyro.

In a further aspect of the invention the input is AC coupled by the first capacitor 502 to provide a symmetrical drive with no low frequency components. During start-up of the laser gyro the controller outputs a 50% duty cycle PWM signal for about 14 ms to charge capacitor 502 to a predetermined DC level. As stated earlier the start up initialization sequence begins by pulsing the dither drive for 20 pulses at the dither frequency with a square wave. For a dither frequency of 500 Hz the duty cycle is changed from 0% to 100% for 20 pulses. This cycling supplies energy to the dither motor near its natural resonant frequency to get the dither motor started.

Figure 4:
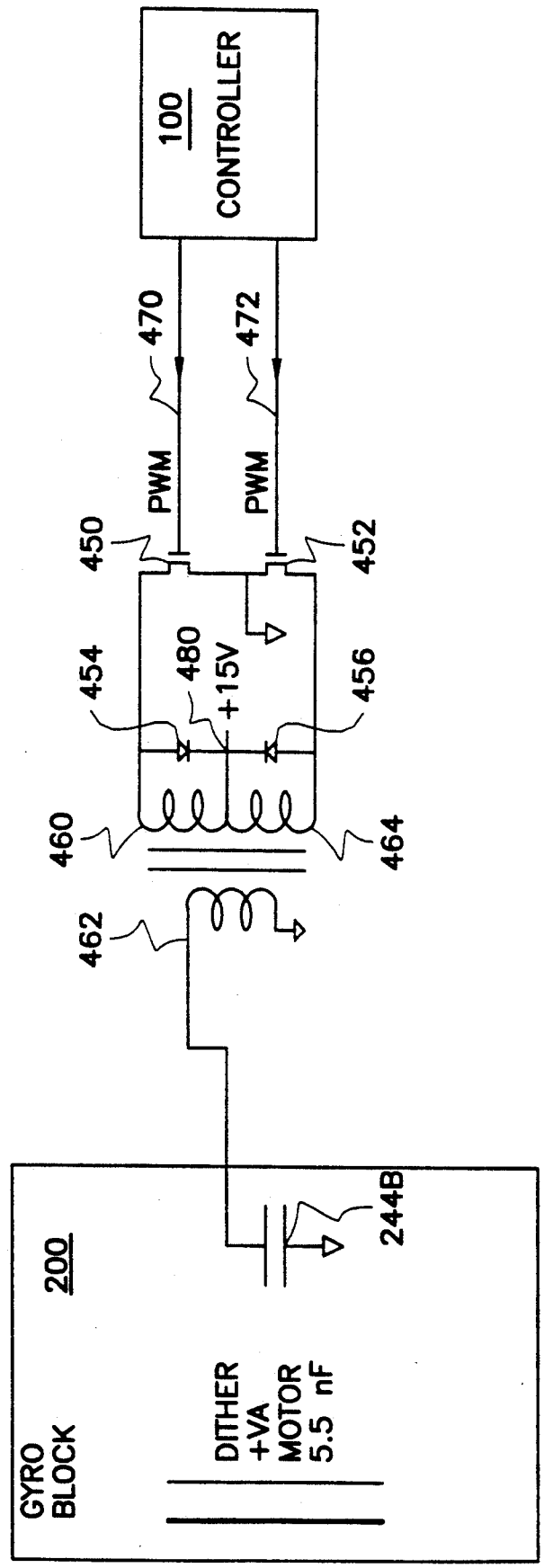
FIG. 4 shows a detailed circuit diagram of an alternate embodiment of a dither drive circuit as provided by one aspect of the invention.

Referring now to FIG. 4 which shows a detailed circuit diagram of an alternate embodiment of a dither drive circuit as provided by one aspect of the invention. The dither drive circuit of FIG. 4 comprises a transformer having primary windings 460. 464 and secondary windings 462. A first diode 454 is connected across winding 460 to a voltage source 480 which may nominally be +15 volts. Similarly, a second diode 456 is connected across winding 464 to voltage source 480. Secondary winding 462 is coupled at a first leg to dither drive 244B in the laser gyro block 200. A pair of transistors 450, 452 are driven by first and second PWM signals 470, 472 in a push-pull fashion. The transistors 450, 452 may advantageously be MOSFET type devices or equivalent devices.

Figure 5A:
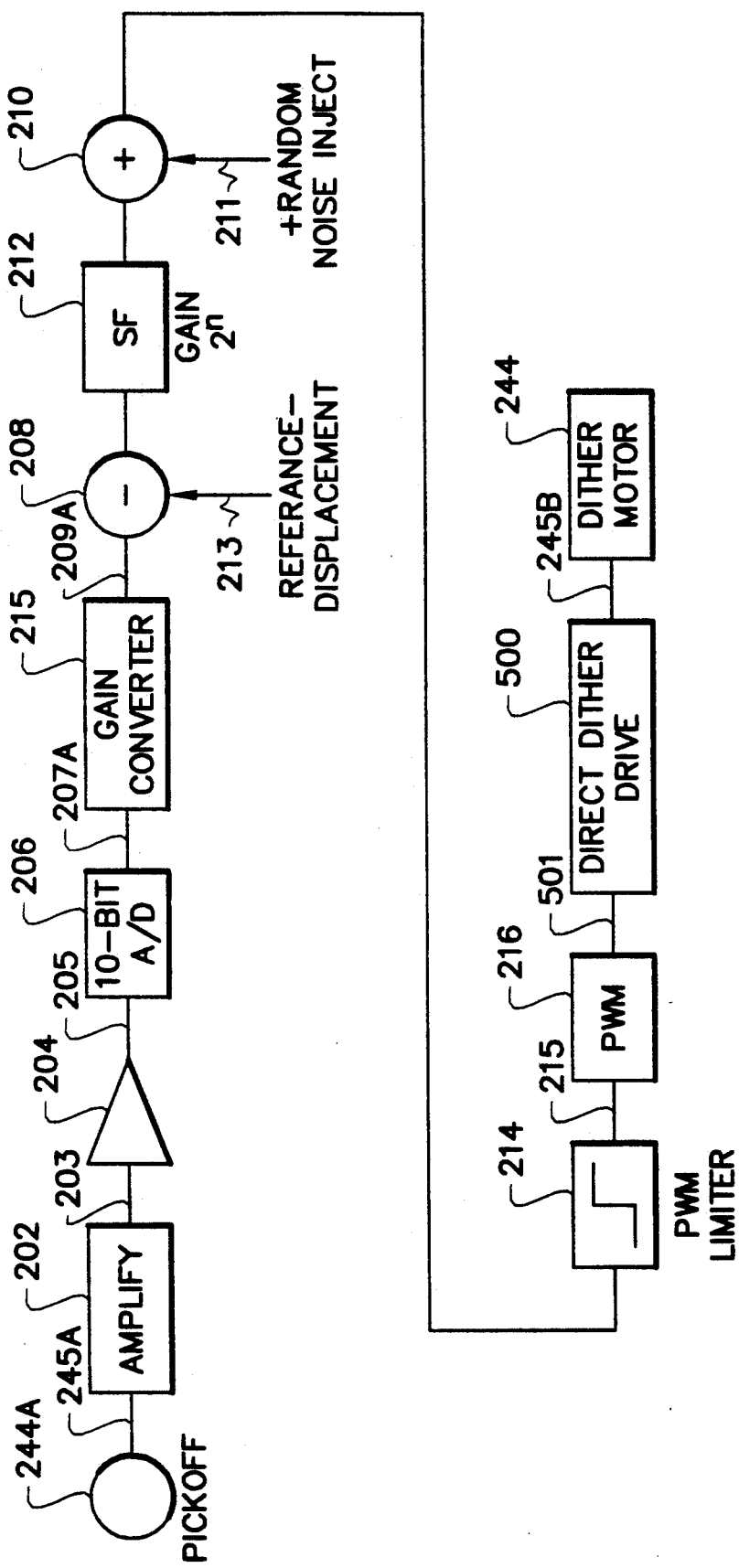
FIGS. 5(a-d) show high level schematic block diagrams of the direct dither drive used in a laser gyro including the closed loop system.
Figure 6:
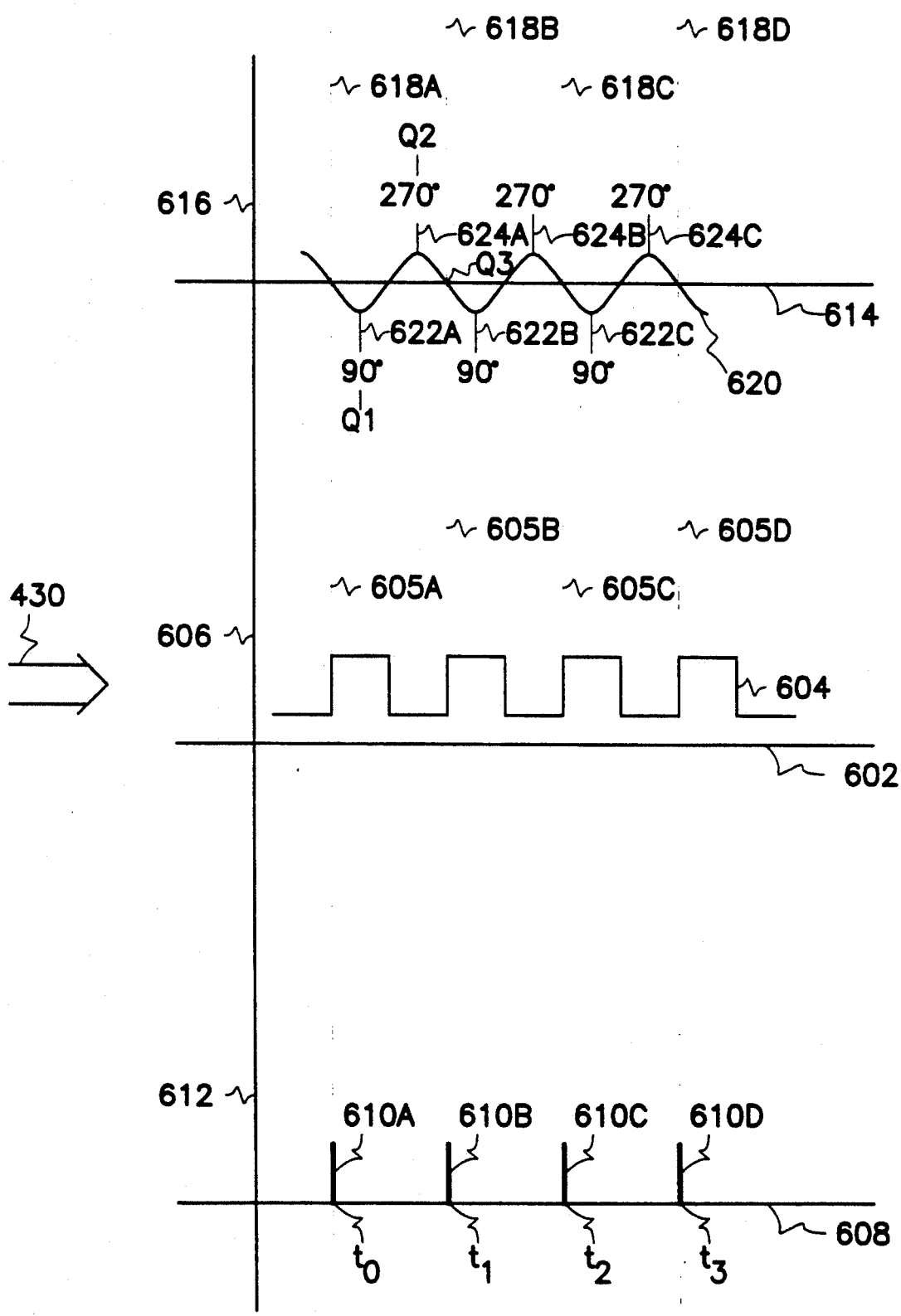
FIG. 6 shows a interrupt timing diagram as a function of the output of the zero crossing detector.

Now referring to FIG. 5A which shows a high level schematic of the direct digital dither drive method and apparatus of the invention showing the flow of the dither pickoff signal 245A from the dither pickoff 244A through to the dither motor 244B. FIG. 5A represents an embodiment of the dither drive that gain converts the voltage 205 representing the dither displacement to laser gyro counts which represent the inertial rotation of the gyro 200. All subsequent processing is carried out using counts up to the generation of the PWM signal 501.

The dither pickoff 244A delivers a dither pickoff signal 245A to a filter 202 which conditions the dither pickoff signal 245A and provides a conditioned pickoff signal 203. The pickoff signal 203 is amplified by amplifier 204 and sent to a 10-Bit A/D converter 206. A/D converter 206 processes the conditioned and amplified dither pickoff signal 205 into a digital signal 207A representative of the dither pickoff signal 245A voltage The digital signal 207A is then gain converted by multiplier 215 to a count value 209A representing angular displacement of the gyro block 200.

In the embodiment of FIG. 5A the digital signal 207A is converted into counts by being multiplied by a predetermined constant K. One count is approximately equal to one arcsec of angular displacement. The constant K is in counts/volt units. K is the same constant used in the dither stripper to obtain an equivalent digital volts. The constant K is continuously updated by the dither stripper and gives a direct calibrated correlation between dither pickoff analog volts and equivalent digital readout counts.

A predetermined reference displacement dither angle 213 expressed in digital counts is stored in the EEPROM 102.

The digital signal then flows to a digital gain amplifier 212 which feeds a random noise injector 210 which injects random noise 211 in the signal. Random noise 211 is provided to prevent the lasers from experiencing dynamic lock in effects. The signal then enters a pulse width modulation limiter 214 which, in turn, provides a signal 215 to the pulse width modulator, 216. The PWM signal will depend on the difference between the reference value and measured displacement value of the block. The direct dither drive is shown in more detail in FIG. 3.

Figure 5B:
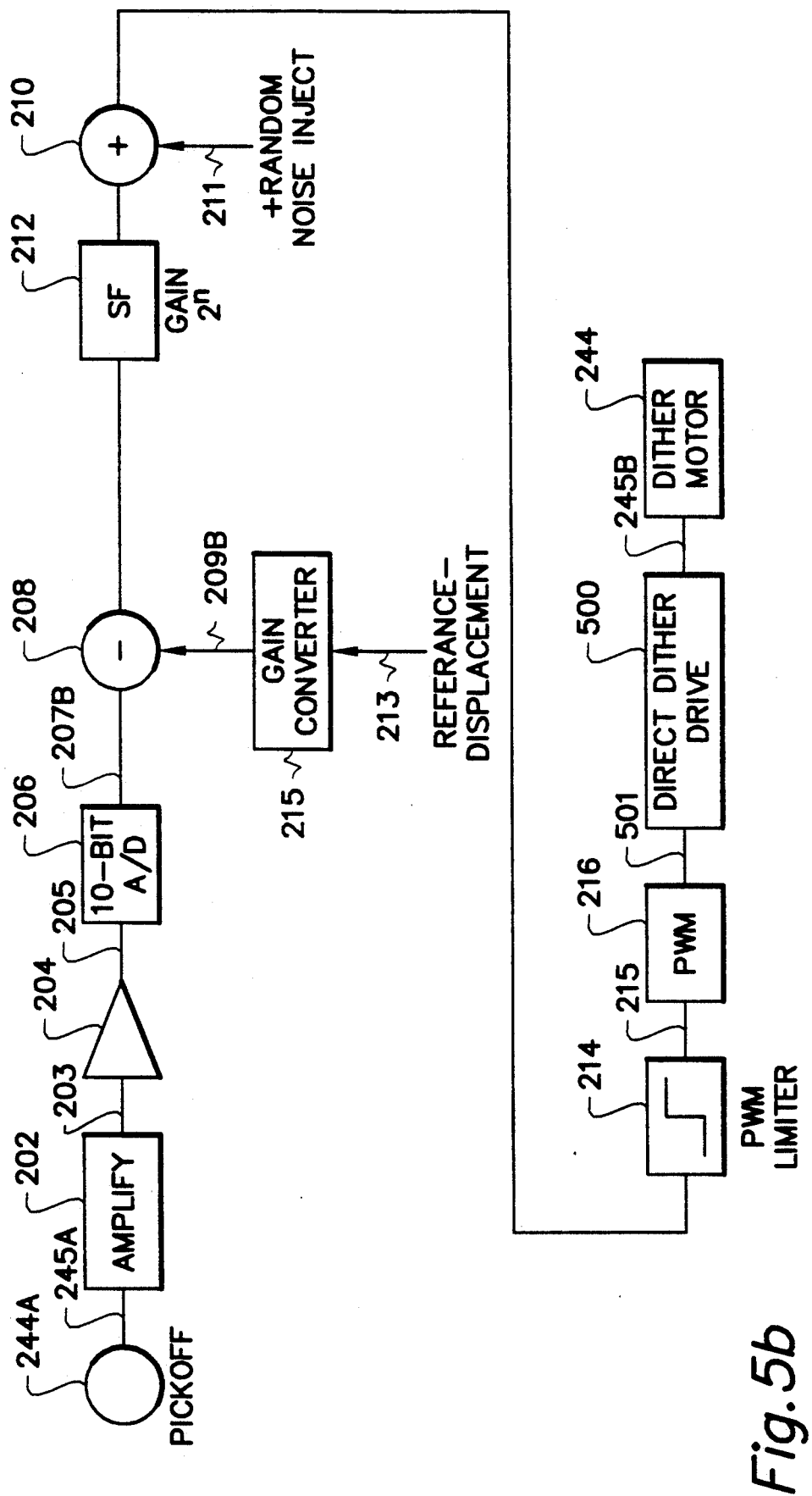

Referring now to FIG. 5B which shows an alternative high level schematic of the direct digital dither drive method and apparatus of the invention showing the flow of the dither pickoff signal 245A from the dither pickoff 244A through to the dither motor 244B. FIG. 5B represents an embodiment of the dither drive where all processing is carried out using volts up to the generation of the PWM signal 501.

In the alternate embodiment of the invention shown in FIG. 5B the output of the A/D converter 206 is fed to the comparator 208 to generate a signal that represents a voltage instead of counts as in FIG. 5A.

A predetermined reference displacement dither angle 213 expressed in digital counts is stored in EEPROM 102. In the embodiment of FIG. 5B the reference displacement 213 is converted into digital volts by being multiplied by the reciprocal of the predetermined constant K. The remainder of the processing in FIG. 5B proceeds as in FIG. 5A.

Figure 5C:
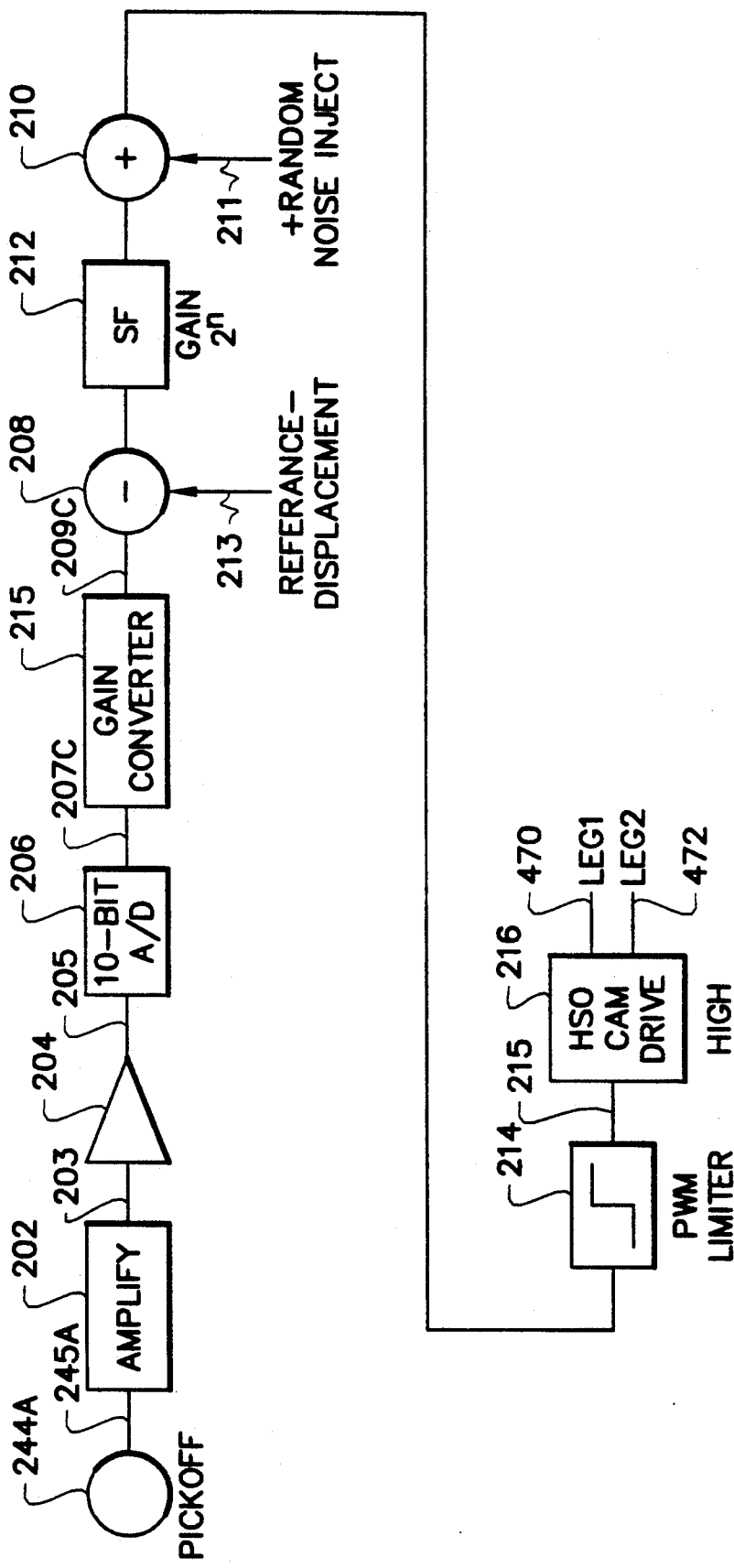

Referring now to FIG. 5C which shows an alternative high level schematic of the direct digital dither drive method and apparatus of the invention showing the flow of the dither pickoff signal 245A from the dither pickoff 244A through to Leg1 470 and Leg2 472 of the dither motor 244B. As in the method and apparatus of the invention according to FIG. 5A, FIG. 5C represents an embodiment of the dither drive that gain converts the voltage 205 representing the dither displacement to laser gyro counts which represent the inertial rotation of the gyro 200. All subsequent processing is carried out using counts up to the generation of the high speed output content addressable memory (HSO CAM) drive signals 470 and 472.

In FIG. 5C the digital signal also flows to a digital gain amplifier 212 which feeds a pulse width modulation limiter 214 which, in turn, now provides a pulse width modulation signal 215 to the HSO CAM Drive 216 of the digital dither drive. As with the foregoing embodiments the PWM signal will depend on the difference between the reference value and measured displacement value of the block.

The high speed output logic in this embodiment of the invention is provided by the HSO unit on the 80C196KC microprocessor from INTEL CORPORATION. The high speed output logic triggers events at predetermined times. The events are orchestrated by writing commands to what is referred to as HSO command register and HSO time register. Different events are possible with the high speed output including A/D conversions, resetting timers, resetting software flags, and switching high speed output lines. More information is available on the high speed output logic referring to the 80C196 KC User's Guide from INTEL CORPORATION on pages 5–49. Specifically reference FIG. 10-1 in the 80C196 KC User's Guide which describes the HSO command register. The input to the direct dither drive 500 is generated from the HSO CAM drive or the PWM output of the 80C196KC microcontroller. The structure of the direct dither drive 500 is shown in more detail with reference to FIG. 3.

The high speed output CAM drive 216 then provides the dither signals to drive Leg 1 at 470 and drive Leg 2 at 472.

Figure 5D:
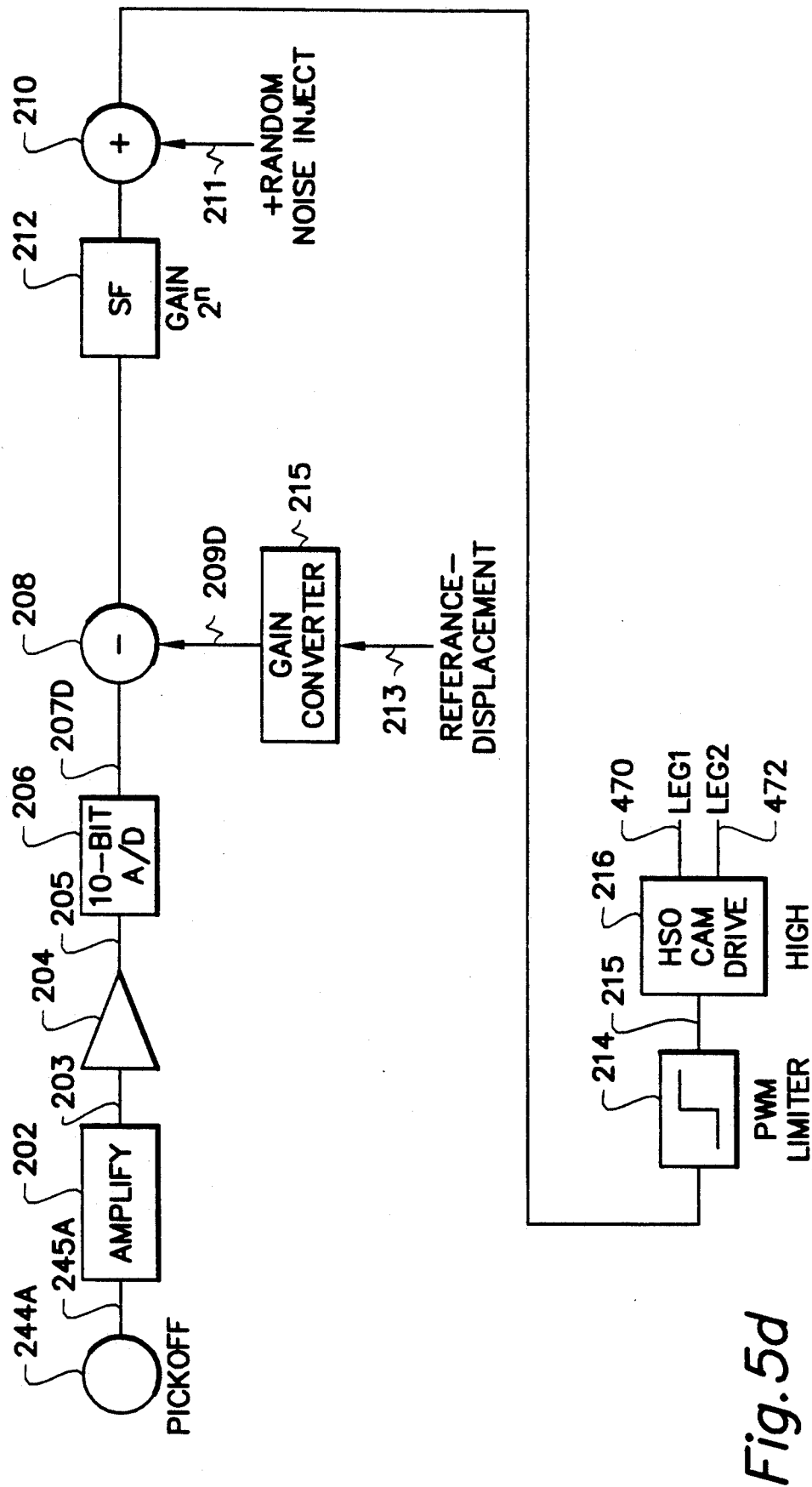

FIG. 5D represents an embodiment of the dither drive where all processing is carried out using volts up to the generation of the HSO CAM drive signals 470 and 472.

Now referring to FIG. 6 which shows a detailed interrupt timing diagram of the method of the invention. The direct drive dither system in one embodiment of the invention uses the output 430 of the zero crossing detector of FIG. 2 to trigger an interrupt. Signal 430 of FIG. 2 provides a wave train that resembles a timing clock. The detail of the wave train is shown in FIG. 6 as a group of square waves 604. The wave train is shown as the output of signal line 430 as a function of time 602. The signal 604 indicates when the gyro block 200 has crossed the zero point in its cyclic dither motion as indicated by gyro block position signal 620. The zero crossing points are indicated by 618A, 618B, 618C and 618D. The generated interrupts are shown as interrupts 610A, 610B, 610C and 610D. The interrupts are generated on the zero crossing 618A, 618B, 618C and 618D of the block 200 corresponding to a low to high transition of the output signal 430 at points 605A, 605B, 605C and 605D.

The frequency of the dither pickoff 244A can be calculated by noting when in time the low to high transitions occur. In FIG. 6 $t_0$ denotes the occurrence of transition 605A generating interrupt 610A, $t_1$ denotes the occurrence of transition 605B generating interrupt 610B, $t_2$ denotes the occurrence of transition 605C generating interrupt 610C, and $t_3$ denotes the occurrence of transition 605D generating interrupt 610D. The frequency of dither can be calculated with this set of information from interrupt to interrupt by dividing the time difference $(t_1-t_0)$ into 1 cycle or $1/(t_1-t_0)$. The frequency of dither can be calculated with this set of information between more than one interrupt by dividing the time difference between interrupts, 610A and 610D, $(t_3-t_0)$ into 3 cycles or $3/(t_3-t_0)$.

In one embodiment of the method of direct dither of the invention the location of the 90° and 270° block cycle positions is required to be measured. The 90° positions are shown in FIG. 6 as points 622A, 622B and 622C. The 270° positions are shown in FIG. 6 as points 624A, 624B and 624C.

Figure 7:
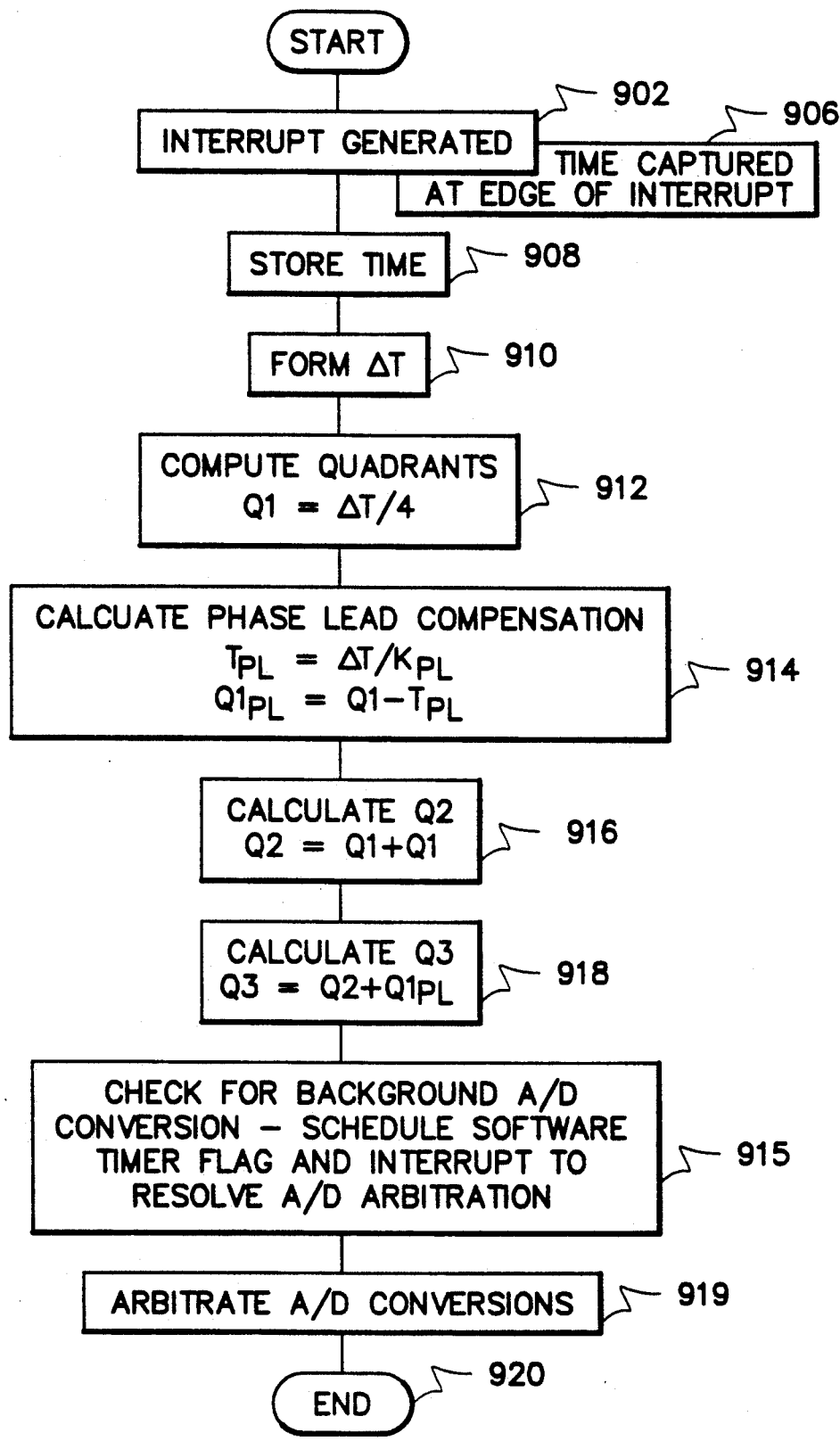
FIG. 7 shows a method of determining the 90° and 270° crossing points of the dither cycle.

Now referring to FIG. 7 which shows the method of the direct digital dither drive apparatus of the invention to determine the 270° and 90° crossing points of the dither cycle. The method first starts with process block 902 which shows the interrupt as generated by the zero crossing detector output 430. The zero crossing detector is shown in prior figures in FIG. 2 and FIG. 6 as signal 604. The interrupt signal from the zero crossing detector is known in one embodiment of the method of the invention as the T2CAP interrupt. The process then flows to 904 where the T2CAP interrupt service routine is executed. The T2CAP interrupt service routine is described in the following process flow diagrams. The time at which the T2CAP interrupt occurred is captured in 906. The process then flows to 908 where the time of the interrupt, Tn, is stored in a temporary register. The process then flows to 910 where the change in time is computed from the last interrupt. The first time this process is executed the initial time is approximated. The new time, Delta T, is determined to be the difference between the current time minus the last interrupt time. The process then flows to 912 where the elapsed time or the difference in time between the two interrupts is divided by four. This procedure is done to determine the quadrature for the difference in time between interrupts. This number is as accurate as the resolution of the digital system and represents the amount of time between zero crossings of the dither cycle. This in turn represents the frequency of the actual dither of the laser gyro block.

The process then flows to process 914 where the phase lead compensation is calculated. The phase lead compensation is determined in the T2CAP interrupt shown in FIG. 7. The phase lead is defined as Delta T divided by a constant $K_{PL}$. Delta T corresponds to the amount of time required for the laser block to dither one cycle or Delta T equals 360°. The constant $K_{PL}$ is a predetermined value based on the dither cycle and the analog delay. For example if the predetermined constant $K_{PL}$ is equal to 32 the phase lead would be 360°/32 or 11.25°. The amount of phase lead time defined as $T_{PL}$ would be calculated by multiplying Delta T by the phase lead proportion of the cycle or $T_{PL}$=Delta T * (11.25°/360°). The objective of the phase lead is to provide a dither drive signal that coincides with the desired actual dither drive signal. This phase lead anticipates the associated delay in the processing circuitry of the dither drive and the associated delay in software processing. The first quadrature Q1 corresponds to the actual displacement of the laser block at the 90° position. The phase lead quadrature, $Q1_{PL}$, is defined as $Q1-T_{PL}$ which represents the actual sample time for the high speed output dither drive CAM 216 shown in FIG. 5. The process of FIG. 7 then flows to 916 where the halfway point Q2 is determined to be twice the sum of the first quadrature (Q1+Q1). The process then flows to 918 where the third quadrature Q3 is determined to be $Q2+Q1_{PL}$. The T2CAP interrupt of FIG. 7 then checks for the existence of a background A/D conversion if necessary. A need for a background A/D conversion schedules a software timer flag and interrupt which will be used by the arbitration method of the invention shown in FIG. 12 to resolve the use of the current A/D conversion. The software timer flag and interrupt are scheduled using the high speed output logic. The process then flows to step 919 where the A/D Conversion for the dither drive and dither stripper are arbitrated with background A/D conversions. Process 919 is described in detail with reference to FIG. 8. The process ends at 920 and returns to the running modular gyro monitor control loop shown in FIG. 9.

Figure 9:
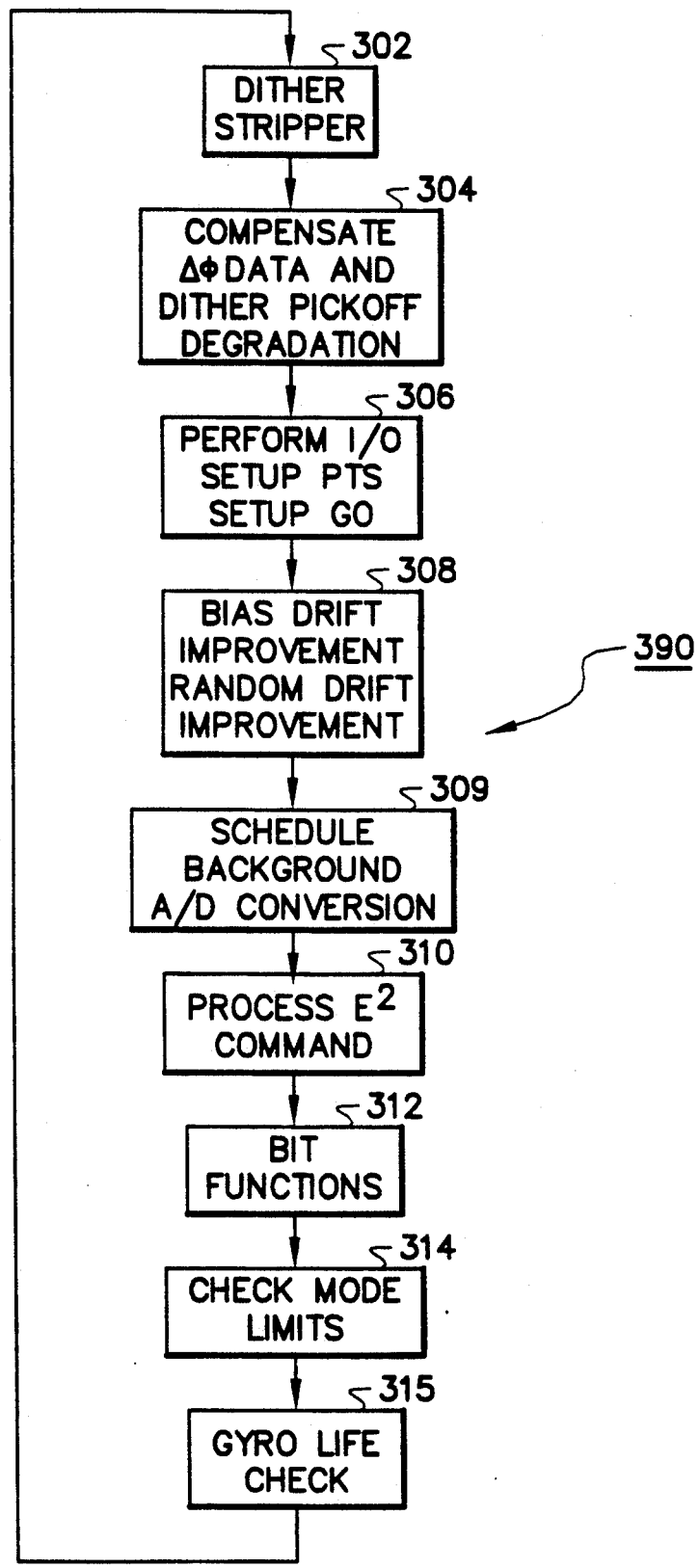
FIG. 9 shows the method of monitoring the modular gyro with the monitor control loop.

Monitor control loop 390 shown in FIG. 9 is the main process execution loop for the digital modular gyro 10. The monitor control loop waits for the dither stripper A/D conversion to complete at step 300 before executing the process of the monitor control loop. A conversion complete flag is included in the apparatus of the invention which if set indicates that the A/D conversion completed. The monitor control loop 390 shows first the execution of the dither stripper algorithm 302. The compensation of the rotational inertial navigation data for temperature bias drift and age occurs next in step 304. The monitor control loop 390 performs I/0 set up for the system in 306. The process then flows to the bias drift improvement and random drift improvement step in 308. The process then flows to 310 where any commands, given by an outside system, for the modular gyro are processed. The process executes a built-in test function at 312 and checks laser mode limits in process 314. The monitor control loop 390 then repeats this set of processes until the modular gyro 10 is shut down.

Figure 15:
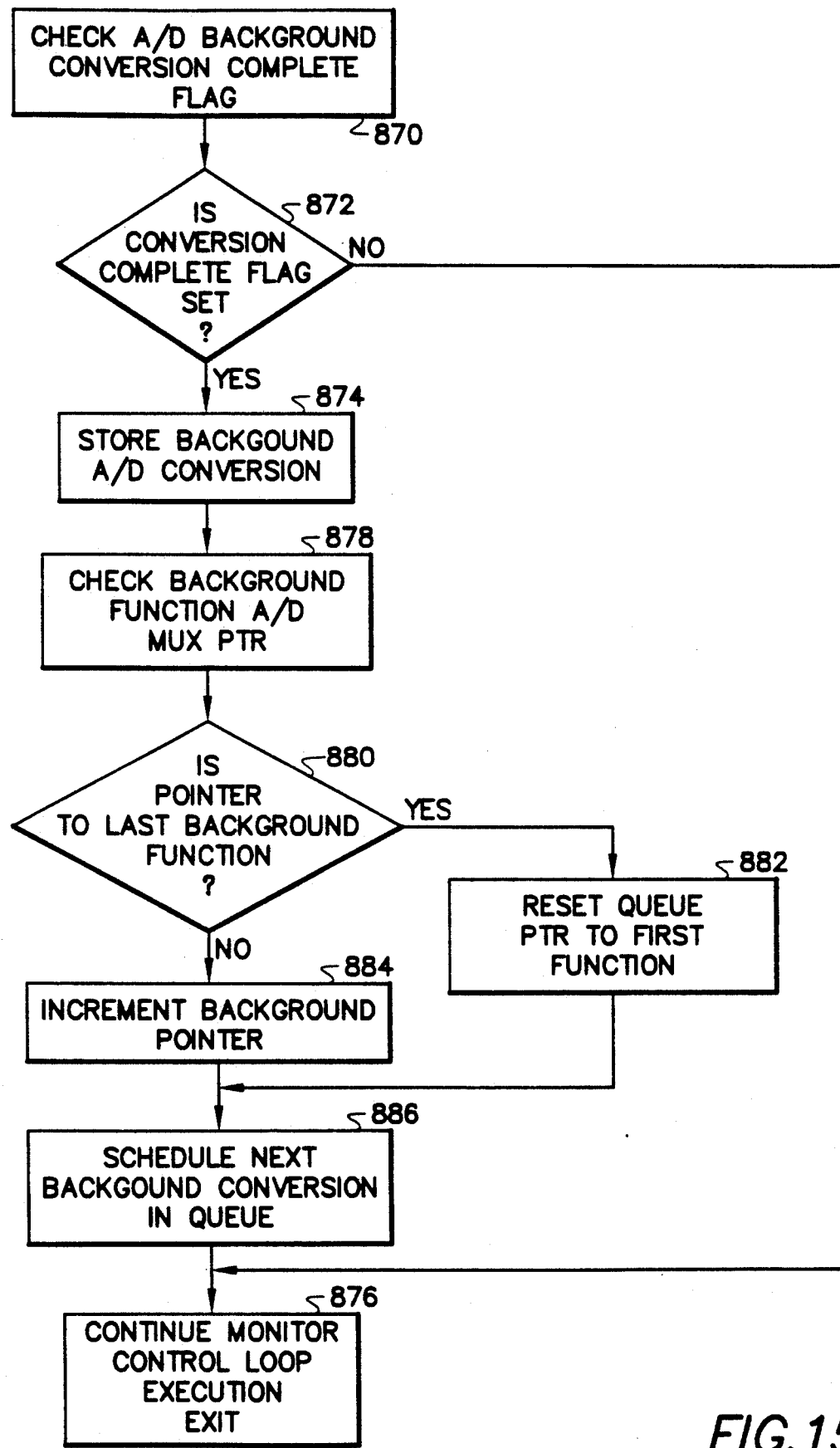
FIG. 15 shows the method of the invention to queue a background analog to digital conversion.

Now referring to FIG. 15 which shows the method of scheduling a A/D background conversion. The scheduling of the A/D background conversion occurs in a hardware system that has a predetermined set of A/D conversion events that can be scheduled in a queue. The number of A/D conversions are predetermined. In one example embodiment of the invention there are seven A/D conversions in the queue. The process of arbitrating them with the monitor control loop shown in FIG. 9 first starts in step 870 where the A/D background conversion complete flag is checked. The process then flows to 872 where the conversion complete flag is checked to see if it is set. If it is not set the process flows to exit the routine to return to the monitor control loop in step 870. In this case the A/D conversion cannot be accomplished because the A/D conversion for the last scheduled A/D conversion is not done yet. If the conversion complete flag is set the process flows to step 874 where the current background A/D conversion is stored in a background conversion A/D register. This relates the current background A/D conversion to a function that is set up by another routine such as measurement of temperature, PLC monitoring, etc. The process then flows to step 878 where the background A/D conversion multiplexer pointer is checked. The process then flows to 880 which determines what to do after the pointer is checked. If it points to the last background function then the queue is reset in step 882 to point to the first function. It the pointer is not the last background function then the process increments to the next background function pointer in 884. The process in either case flows to step 886 to schedule another background conversion in the queue. The process then exits to the monitor control loop in 876.

Figure 8:
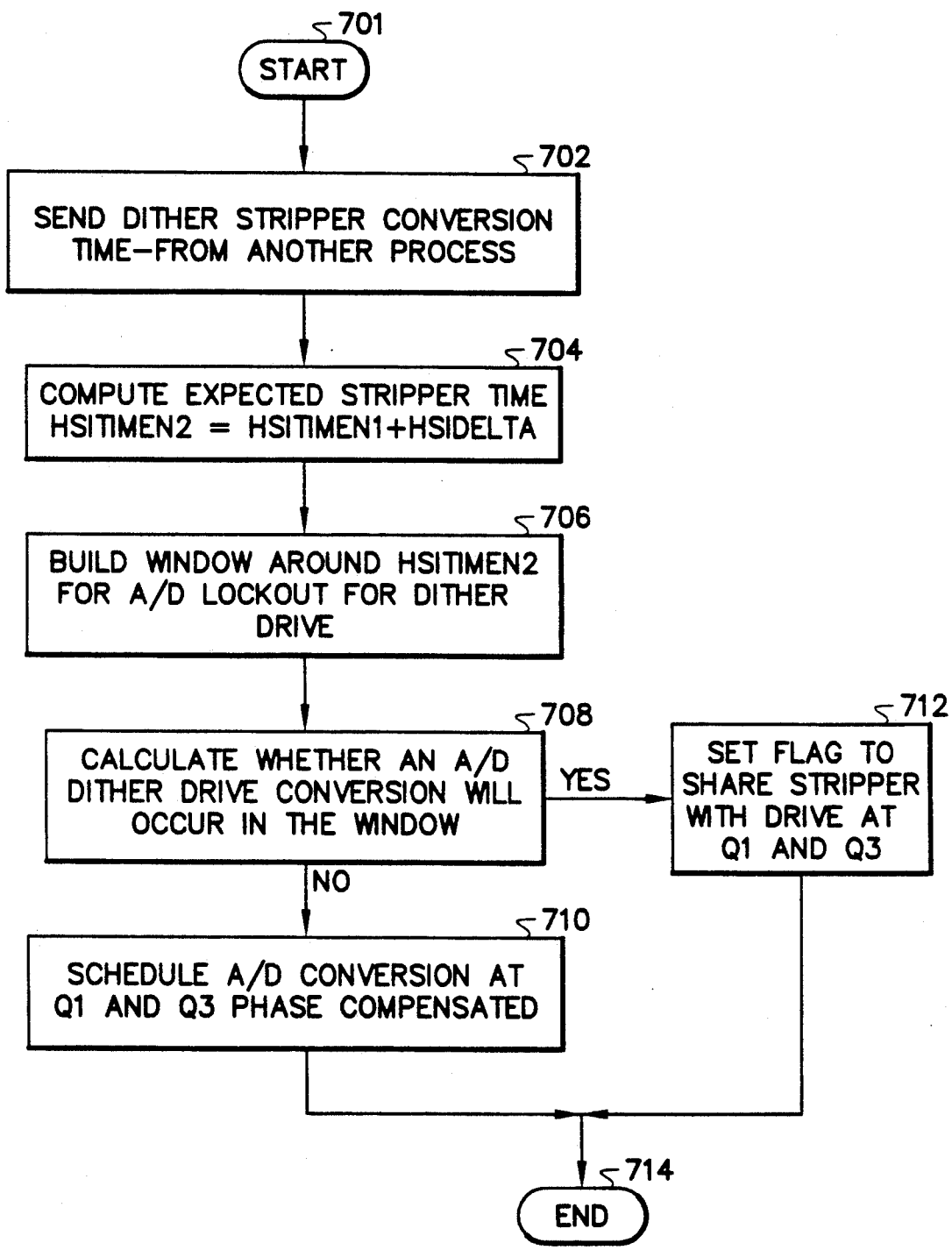
FIG. 8 shows a schematic representation of the method and apparatus of the invention used to arbitrate a single analog to digital converter between a multiple number of other modular gyro functions.

Now referring to FIG. 8 which shows the method of arbitrating a single analog to digital converter between multiple analog signal inputs in the digital dither drive application of the method of the invention. FIG. 8 shows a process flow diagram in which the digital modular gyro 10 transfers a dither stripper conversion time 702 to step 702. The conversion time HsiTime1 is calculated from the dither stripper process which is described in applicant's copending application entitled Laser GYRO DITHER STRIPPER.

The process then flows to compute the expected stripper time which is calculated from two values which are sent in process 702. The first value is the HsiTime1 which is the beginning of the dither stripper conversion time and the HsiDelta which is also sent from the external system through process 702. The expected dither stripper sample time is the sum of the HsiTime1 and HsiDelta. This time is called HsiTime2. The process then flows to 706 where a window is built around the HsiTime2 to lock out the A/D converter for the dither drive. This prevents dither drive A/D conversion from interfering with the dither stripper A/D conversion if they occur simultaneously. The A/D converter in this embodiment of the invention is an asynchronous converter. The A/D conversion will occur asynchronously with the processes that set the A/D conversion up. Process step 708 calculates whether or not the A/D conversion for the dither drive will occur in the dither stripper window. The process then forks to either process step 712 or process step 710. Process step 710 sets up the high speed output content addressable memory (HSO CAM) to schedule a phase compensated A/D conversion and software timer flag and interrupt specifically for the dither drive. Process step 712 sets up the HSO CAM to schedule a software timer flag and interrupt specifically for the dither drive to share the already scheduled dither stripper A/D conversion. The method of the invention checks the software time flag's condition to determine what type of action to take at the scheduled time, whether a dither stripper conversion, dither drive conversion, a shared dither stripper and dither drive conversion or a background conversion. Process step 708 provides a method of either scheduling a new A/D conversion or sharing the one that is scheduled to happen. Implicit in the method of the invention is the assumption that a single A/D conversion within the window is adequate for dither drive applications because the dither stripper A/D conversion is always of highest priority. In process 712 a flag is set which will indicate to another routine, namely the dither drive routine and the dither stripper routine that the A/D conversion will be shared. In process step 710 the A/D conversion is scheduled and the result of the conversion is sent to the content addressable memory within the microcontroller 100 for the high speed output logic described below. The A/D conversion is scheduled at time Q1 and Q3 which have been phase compensated as described above. The process then flows to 714 where the arbitration of the A/D converter has been completed.

Figure 10:
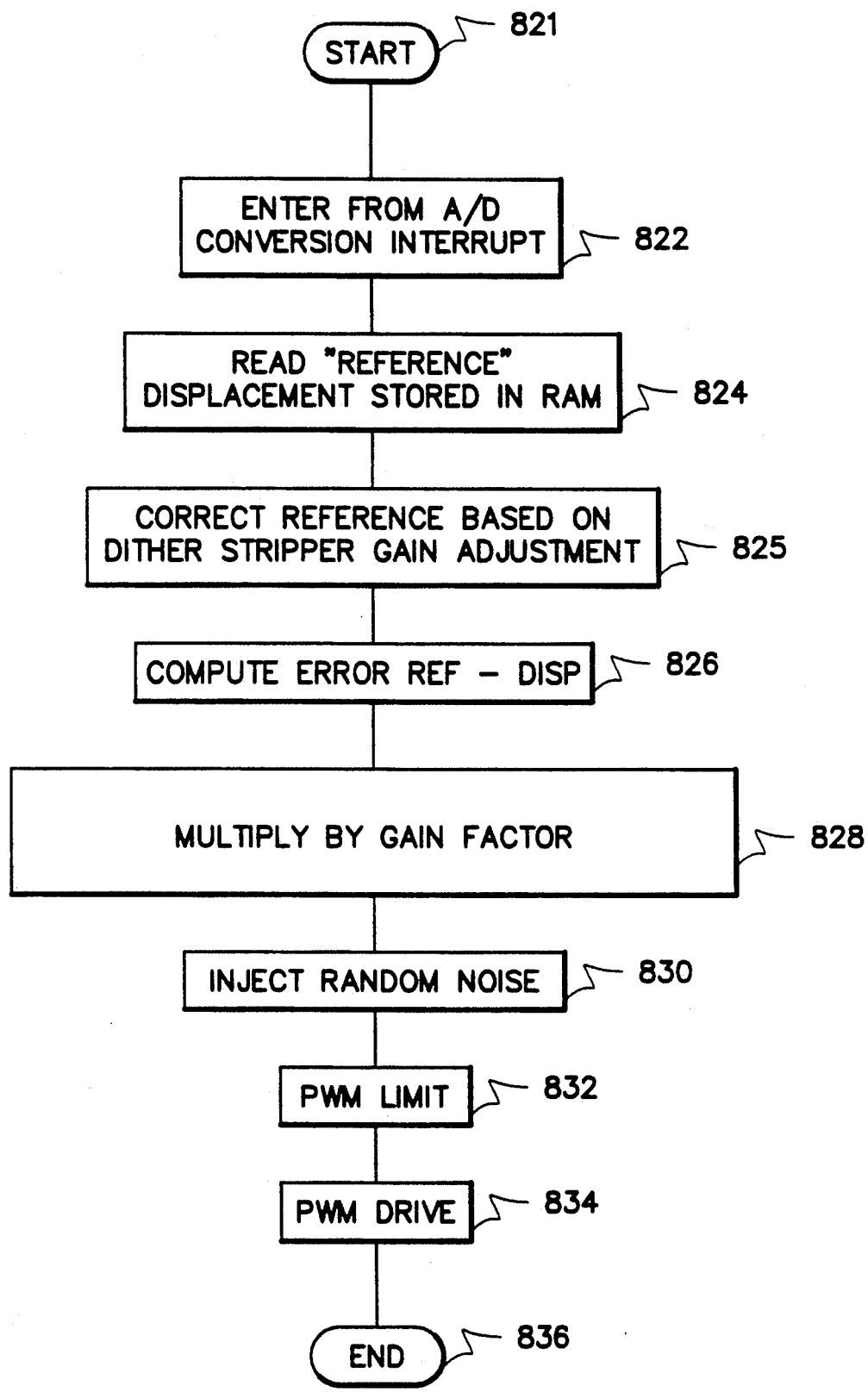
FIG. 10 shows a method of processing a dither pickoff signal that has been digitized and converted from a dither pickoff.

Now referring to FIG. 10 which shows the method of computing the pulse width modulated drive signal from the analog to digital conversion of the dither pickoff. The method of the invention which is embodied in the 80C196 KC microcontroller 100 starts in process block 821 with an A/D conversion interrupt from the dither drive routine at 822. The reference displacement, which is the amount of angular displacement of the dither motor expressed in readout counts that should have occurred, is read from memory in step 824. The dither angle reference counts are converted to equivalent analog pickoff signals in digital volts based on the dither stripper gain adjustment at step 825.

The process then flows to 826 where the error in the dither motor displacement is calculated as the reference displacement minus the actual displacement. The process then flows to 828 where the computed error is multiplied by a predetermined gain factor which is 50 in one embodiment of the invention. The process then flows to 830 where random noise is injected into the system at 830. By way of example and not limitation in one embodiment of the invention the distribution of the random noise is Gaussian. The process then flows 832 where the pulse width modulated signal output will be limited to a maximum value of 100% PWM and a minimum of 0% PWM to avoid rollover of the register. In this embodiment of the invention the limiting value is 0 or 255 representing a PWM of 0% or 100%. The process then flows to step 834 where the dither drive is provided with the calculated drive level to bring the dither motor within the reference value adjusted by the injected random noise. The process then ends at 836.

Figure 11:
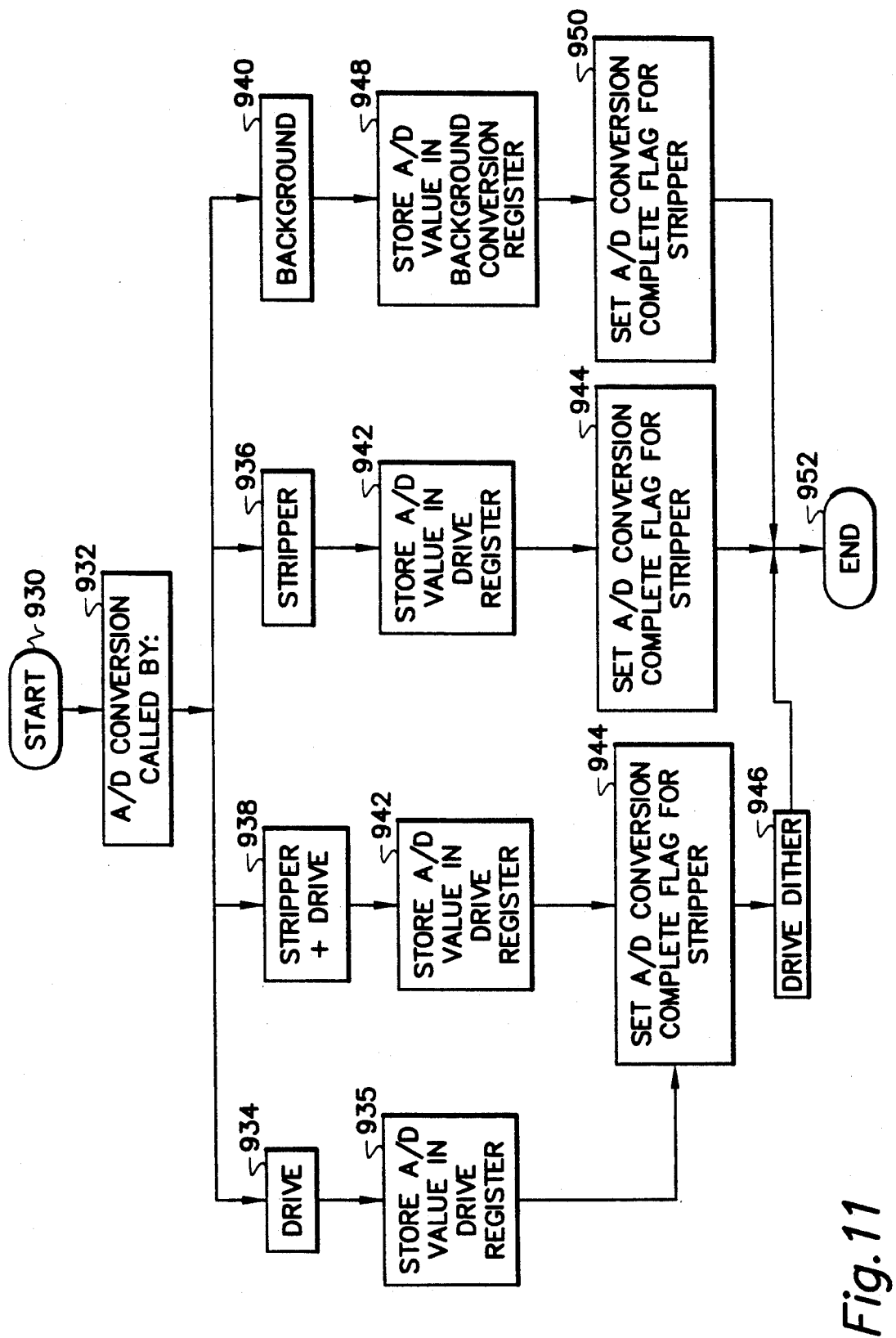
FIG. 11 shows a schematic diagram of the method of handling an A/D conversion when called by either the drive and the stripper and the background processes.

Now referring to FIG. 11 which shows a schematic representation of the direct digital dither drive A/D conversion handler. A/D conversions are required in the modular gyro for dither drive, dither stripper and background conversions such as those required to compute the quadratures of the dither. The process shown in FIG. 11 is the method by which the A/D conversions are handled depending on which process called the A/D conversion. The method starts at 930 with an A/D conversion interrupt. The source of the A/D conversion is determined to originate from, in process block 932, either the dither drive at 934, the dither stripper at 936, the dither stripper and dither drive 938 or background processes 940. The stripper and drive step 938, indicates that the dither drive A/D conversion happened within the dither stripper A/D conversion window. The process flows to step 942, just as a simple dither stripping operation, because the window for the dither stripper will be adequate for the dither drive also. The digital drive 934 calling the A/D conversion flows directly to the dither drive at 946. The dither drive routine is described in more detail in FIG. 10.

By the time the A/D conversion "happens" it is already known which processes called for the A/D conversion. This was predetermined by the T2CAP interrupt shown in FIG. 8 and software timer interrupts.

The process flows to step 942 if the dither stripper or the dither drive and dither stripper call for an A/D conversion wherein the A/D value in the stripper register is read. The A/D conversion complete flag is then set at 944 to indicate that the recent A/D conversion value for the stripper or stripper and drive is in the stripper register and was called by the stripper and drive. The process then flows in either case of the drive or stripper and drive to drive the dither at 946. In the instance of a background A/D conversion the process flows to 940 where the A/D value is fetched out of the background register at 948 and the conversion complete flag is set for a background conversion 950. In all cases the process ends at 952.

Figure 12:
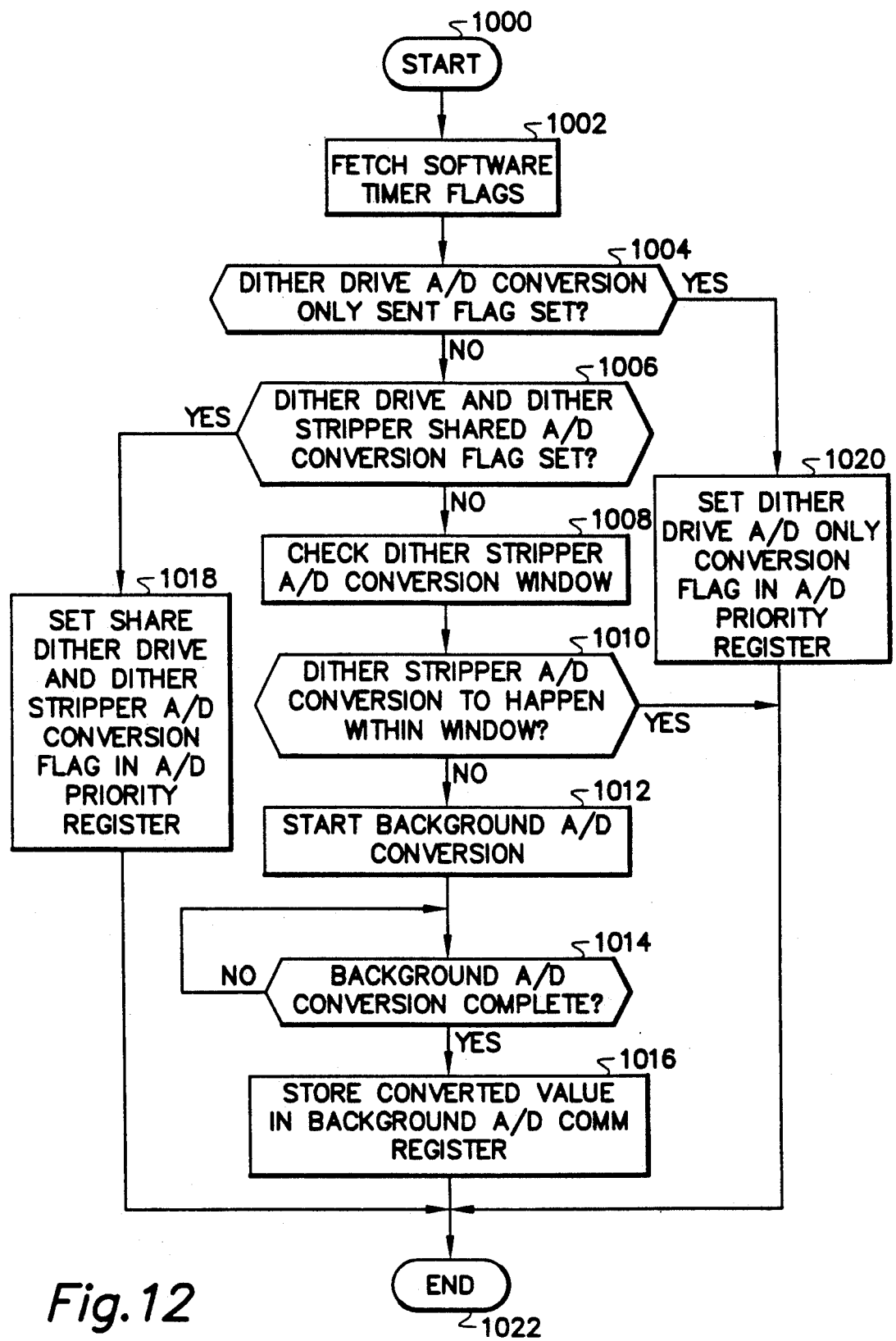
FIG. 12 shows a schematic diagram of the interrupt service routine for the software timer interrupt.

Now referring to FIG. 12 which shows an interrupt service routine for the software timer interrupt to schedule either a dither only conversion, shared conversion or background conversion. The process starts 1000 by fetching a software timer flag in step 1002 from a special function register. The process then checks to see whether or not the software timer flag is set for a dither drive A/D conversion. If so the process proceeds to step 1020 to set the dither drive A/D conversion only flag in the A/D priority register in the microcontroller 100 scratch pad RAM and ends at step 1022. If a dither drive conversion is not indicated then the process flows to step 1006 where the process checks to see whether or not the software timer flag is set for a drive and stripper conversion. If so the process proceeds to step 1018 to set the share dither stripper with the dither drive A/D conversion flag in the A/D priority register in the microcontroller 100 scratch pad RAM and ends at step 1022. If a shared conversion is not indicated then the process flows to step 1008 where the method of the invention checks whether or not a dither stripper A/D conversion is in process. Implicit in the method of FIG. 12 is the condition that if there is not a shared conversion or a dither drive conversion there must be a background conversion. The process then flows to step 1010 to check whether or not the dither stripper A/D conversion will happen within a window defined as HsiTime+HsiDelta as explained in step 702. If the conversion occurs in the window the process ends at step 1022. If the conversion does not occur in the window the process flows to step 1014 to wait for the background conversion to complete. The background conversion will occur within a specified period, in one embodiment of the invention the background conversion occurs within 20 microseconds. The process then flows to step 1016 to store the converted value to the background A/D register. The process then ends at step 1022. Those skilled in the art will recognize that either waiting for the background A/D conversion process to complete can be interrupt driven as described in FIG. 11 or polled as described in FIG. 12.

Figure 13:
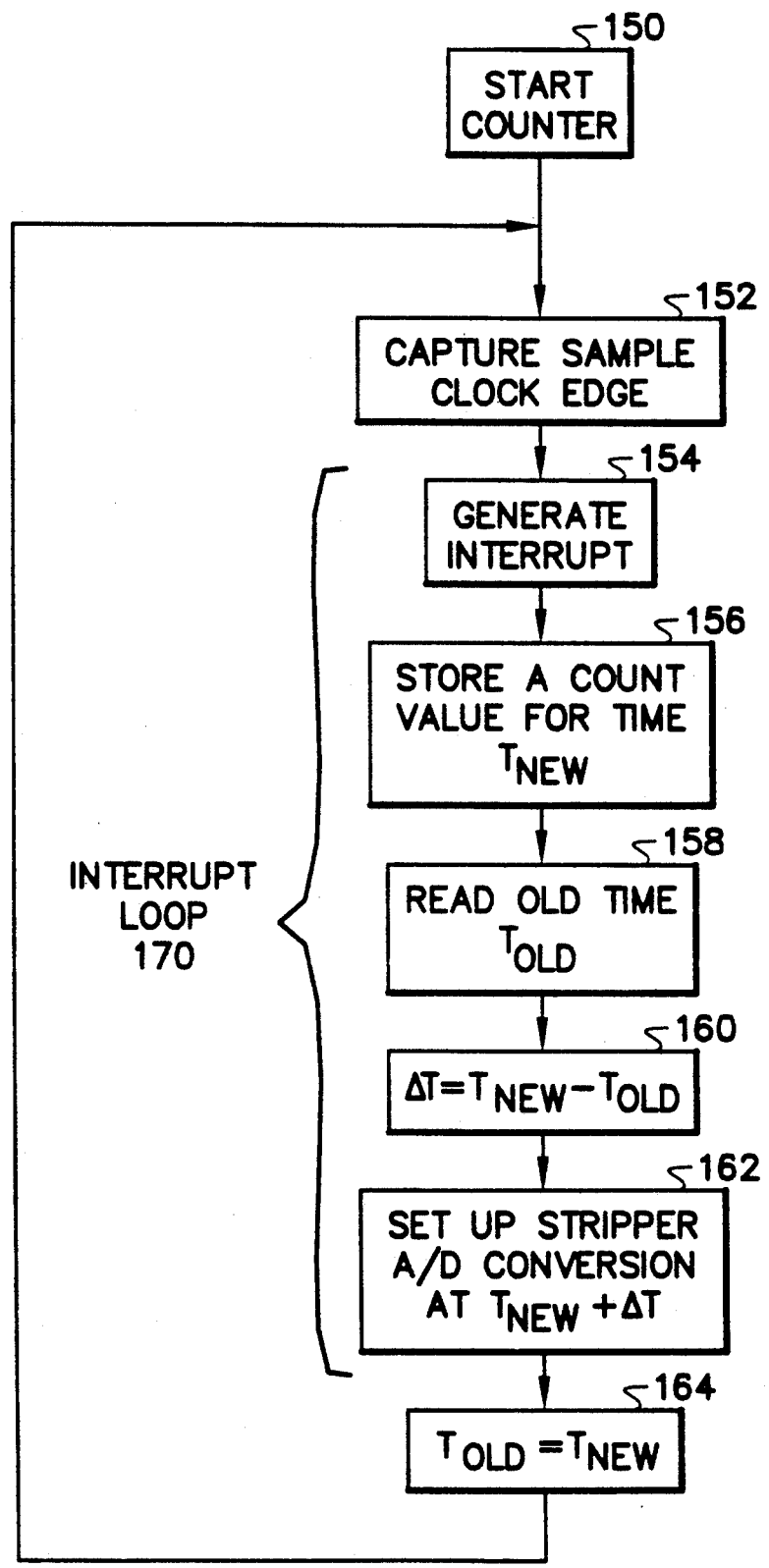
FIG. 13 shows the method of the invention used to predict the sample strobe.

Now referring to FIG. 13 which shows the method of the invention used to compute and anticipate the occurrence of the next system sample clock. The importance of anticipating the sample clock is illustrated by the need for the external inertial navigation system to obtain inertial navigation data which is synchronized to a external clock uniform throughout the inertial navigation system. Without this capability inertial navigation data would be provided asynchronously thus resulting in inaccurate evaluation of inertial position. The process of FIG. 13 starts by starting a counter in process block 150 when the process is first initialized. The process then flows to process block 152 where a edge of a sample clock from the system is captured which generates an interrupt in process block 154. The interrupt then starts a process called the interrupt loop 170. The interrupt loop schedules an A/D conversion. A count value from the counter of step 150 is stored at the interrupt time when the interrupt is generated in process step 154. The process then flows to 158 where the last time an interrupt occurs is read from memory. The process then flows to 160 where the difference in time between the old interrupt and the new interrupt is computed as "delta t". The process then flows to 162 where the A/D conversion is set up in the high speed output of the microprocessor. The new time for the high speed output to occur is at the "new t" plus "delta t". The process then flows to 164, the "old t" is set up to be equal to the "new t" and the process returns to process 152 where the next sample clock is captured. The method of FIG. 13 dynamically compensates for changes in system sample clock period and dynamically tracks the behavior of the system sample clock. The A/D conversion for the dither stripper is set up in 162 in the HSO logic. The A/D conversion 162 is also used by the dither drive which is described in applicant's copending application ring laser gyro direct dither drive.

Figure 14:
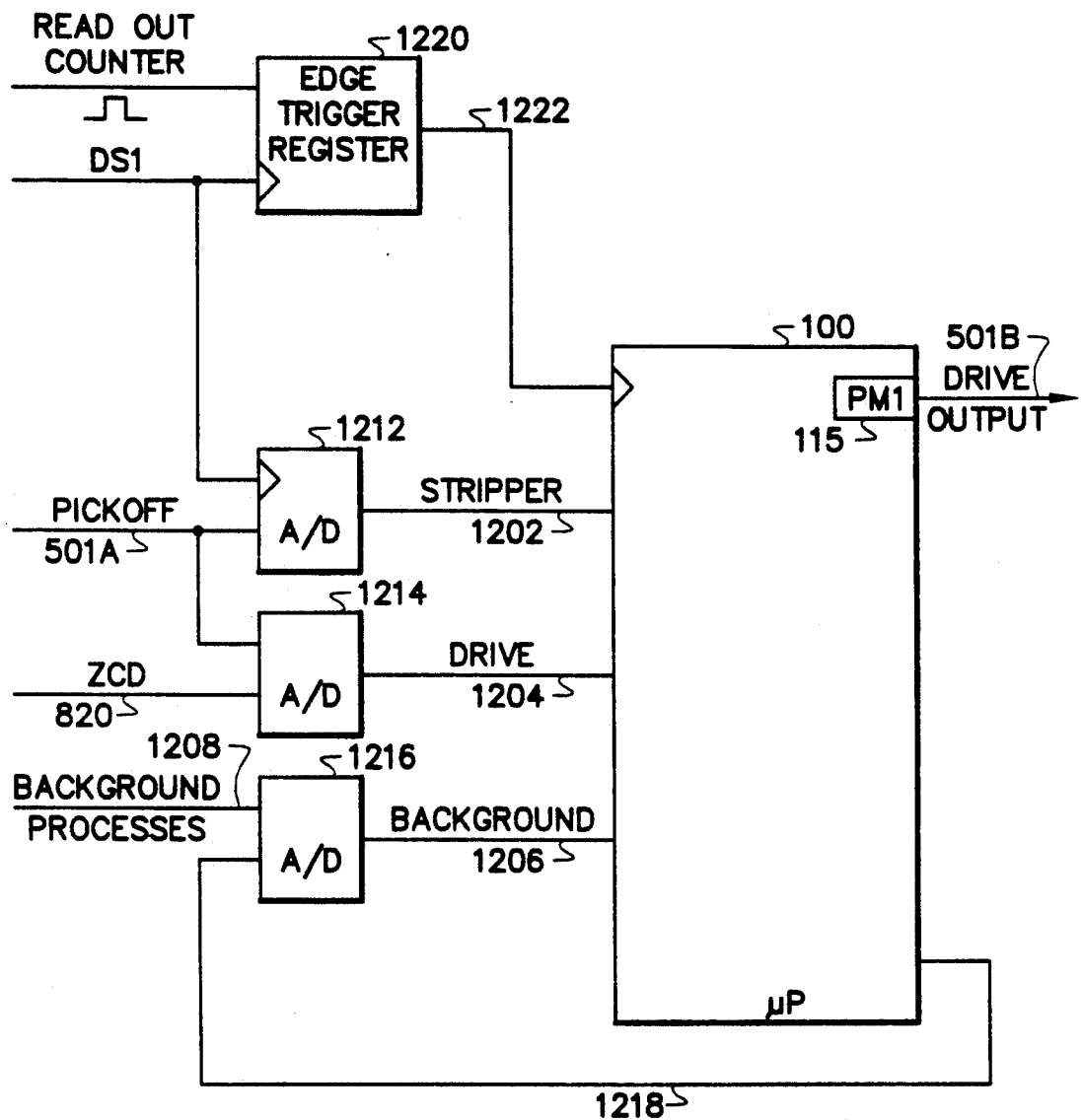
FIG. 14 shows the method of the invention utilizing multiple analog to digital converters.

Now referring to FIG. 14 which shows the method and apparatus of the invention to drive a laser gyro dither utilizing three analog to digital converts. Those skilled in the art will appreciate that the methods of the invention could be applied to the apparatus described in FIG. 14.

In this embodiment the first A/D converter 1212 provides a digital representation of the dither pickoff voltage that is timed appropriately for the dither stripper operations described above. The A/D conversion for the dither stripper must occur when DS1 is active. The microcontroller 100 uses the results of the A/D conversion and the output 1222 of the edge triggered read out counter register 1220 to perform dither striping operations.

The second A/D converter 1214 provides a digital representation of the dither pickoff voltage that is timed appropriately for the dither drive operations described above. The A/D conversion for the dither drive must occur when the zero crossing detector 820 is active. The microcontroller 100 uses the results of the A/D conversion 1204 to perform dither drive operations.

The third A/D converter 1216 provides a digital representation of background processes such as temperature measurement, RIM and LIM measurement, PLC monitoring, etc. Background A/D conversions are enabled by the microcontroller through enable line 1218.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A direct digital dither drive apparatus for a laser gyro having a dithered gyro block with a dither motor and dither pickoff, the direct digital dither drive comprising:
   a. a means for sensing the dither pickoff connected to the dither pickoff and having a dither pickoff output;
   b. a means for amplifying the dither pickoff output having an amplified dither pickoff output;
   c. a means for analog to digital conversion connected to the amplified dither pickoff output having a digital dither signal output;
   d. a means for digital control connected to the digital dither signal output having a pulse width modulated signal output wherein the digital control means generates the pulse width modulated signal in proportion to the digital dither output minus a reference displacement plus a predetermined amount of random noise; and
   e. a means for driving the dither motor in response to the pulse width modulated signal having a dither drive signal connected to the dither motor.

2. The direct digital dither drive apparatus of claim 1 wherein the reference displacement is dynamically adjusted.

3. The direct digital dither drive apparatus of claim 1 wherein the reference displacement is corrected by a dither stripper gain adjustment.

4. The direct digital dither drive apparatus of claim 1 wherein the reference displacement is corrected by a dither stripper gain adjustment and the reference displacement is dynamically adjusted.

5. The direct digital dither drive apparatus of claim 1 wherein the random noise has a Gaussian distribution.

6. The direct digital dither drive apparatus of claim 1 wherein the random noise has a Normal distribution.

7. The direct digital dither drive apparatus of claim 1 further including a power supply which provides a power supply signal, the means for driving the dither motor comprising:
   a. low pass filtering means having an output for providing a filtered signal and an input connected to the pulse width modulated drive signal;
   b. a means for amplifying the filtered signal from the low pass filtering means having an amplified signal output wherein the amplifying means is coupled at an input to the output of the low pass filtering means; and
   c. the dither drive signal responds to the amplified signal output, wherein the driving means includes an active pull-up means including means for providing a dead band operating characteristic.

8. The direct digital dither drive apparatus of claim 7 wherein the active pull-up means substantially eliminates current spikes on the power supply signal so as to provide low power consumption.

9. The direct digital dither drive apparatus of claim 7 wherein the active pull-up means comprises:
   a. a first transistor means having a base, collector and emitter;
   b. a second transistor means having a base, collector and emitter wherein the collectors of the first and second transistor means are connected to a voltage source and the emitter of the first transistor means is connected to the base of the second transistor means in a Darlington configuration; and
   c. diode means connected at a first terminal to the emitter of the second transistor means and at a second terminal to the base of the first transistor means.

10. The direct digital dither drive apparatus of claim 1 wherein the means for driving the dither motor provides an output in the range of +150 to −150 volts in response to the pulse width modulation input ranging from 0% to 100% duty cycle.

11. The direct digital dither drive apparatus of claim 1 further including an analog to digital converter scheduling method wherein the laser gyro further includes a dither stripper sharing the means for analog to digital conversion, the analog to digital converter scheduling method comprising the steps of:
   a. defining a dither stripping begin time and a dither stripping duration;
   b. computing an expected strip time as being the dither stripping begin time plus the dither stripper duration;
   c. building a window of predetermined time around the strip time; and
   d. calculating whether or not the predetermined analog to digital conversion for the digital dither signal will occur within the window and if it does setting a flag to indicate that the stripper analog to digital conversion will be shared with the drive analog to digital conversion.

12. The direct digital dither drive apparatus of claim 11 wherein the dither stripping begin time includes an analog to digital conversion time.

13. The direct digital dither drive apparatus of claim 1 wherein the analog to digital conversions are phase compensated for time delays in analog signal propagation and digital signal processing.

14. The direct digital dither drive apparatus of claim 1 wherein the dither crosses a point of zero magnitude periodically every dither period and the analog to digital conversion of the digital drive signal occurs at one quarter of the way through the dither period called the 90° dither period sample time and three quarters of the way through the dither period called the 270° dither period sample time.

15. The direct digital dither drive apparatus of claim 14 wherein the method of determining the 90° and 270° dither period sample times comprises the steps of:
   a. determining the time of the zero crossing of the dither and defining an interrupt time;
   b. accessing a last interrupt time stored from the previous dither period;
   c. determining a change in time by subtracting the interrupt time from the last interrupt time;
   d. dividing the change in time by four to determine the quarter dither period;
   e. calculating the 90° dither period sample time to equal the quarter dither period minus a predetermined phase lead time;
   f. calculating the half dither period to be the twice the quarter dither period; and
   g. calculating the 270° dither period sample time to equal the sum of the half dither period plus the 90° dither period sample time.

16. The direct digital dither drive apparatus of claim 15 wherein the predetermined phase lead time is equal to the change in time divided by a predetermined compensation constant.

17. The direct digital dither drive apparatus of claim 1 wherein the means for digital control is a microcontroller.

18. The direct digital dither drive apparatus of claim 17 wherein the microcontroller comprises monolithic integrated circuit.

19. The direct digital dither drive apparatus of claim 1 wherein the means for sensing the dither pickoff comprises:
   a. a first capacitor in parallel with the dither pickoff having a first terminal and second terminal;
   b. a first resistor in parallel with the dither pickoff and first capacitor connected between the first terminal and second terminal;
   c. a second capacitor connected to the first terminal and the input of a first amplifier to ac couple the dither pickoff wherein the second capacitor has a filtered dither output;
   d. a first amplifier means for amplifying the filtered dither output having an analog dither pickoff output, a first input and second input wherein the first input is connected to the filtered dither output and the second input is connected to the analog dither pickoff output through a second resistor and fourth capacitor connected in parallel and wherein the second input is connected to ground through a third resistor; and
   e. a second amplifier means for amplifying the analog dither pickoff output having a dither zero crossing detector output, a first input and second a second input wherein the first input is connected to the analog dither pickoff output and the second input is connected to the dither zero crossing detector output thought a fifth resistor and wherein the second input is also connected to ground through a sixth resistor.

20. The direct digital dither drive apparatus of claim 19 wherein a dither drive software interrupt is generated by the transition of the zero crossing detector output.

21. The direct digital dither drive apparatus of claim 20 wherein the frequency of the dither motor is calculated by the number of transitions of the zero crossing detector divided by the time duration of the transitions of the zero crossing detector.

22. The direct digital dither drive apparatus of claim 1 wherein the means for control provides a first pulse width modulated dither drive signal and a second pulse width modulated dither drive signal, and wherein the means for driving the dither motor comprises:
   a. a first transistor means with a first gate, first source and first drain wherein the first gate is connected to the first pulse width modulated dither drive signal and the first drain is connected to ground;
   b. a second transistor means with a second gate, second source and second drain wherein the second gate is connected to the second pulse width modulated dither drive signal and the second drain is connected to ground;
   c. a first induction means having a first coil with a first and second terminal and a second coil with a third and fourth terminal and a center terminal wherein the first terminal is connected to the dither drive signal, the second terminal is connected to ground, the center terminal is connected to a voltage supply means, the third terminal is connected to the first source and the fourth terminal is connected to the second source;
   d. a first diode connected between the third terminal and center terminal; and
   e. a second diode connected between the fourth terminal and center terminal.

23. The direct digital dither drive apparatus of claim 1 wherein an A/D conversion has occurred and is arbitrated between a dither drive method, a dither stripper method and a background method, wherein the A/D conversion may also be shared by the dither drive method and dither stripper method, and wherein the arbitration method comprises the steps of:
   a. determining whether the A/D conversion was called by the dither drive method, the dither stripper method, the shared dither drive method and the dither stripper method or the background method;
   b. storing an A/D value in the dither stripper register if the A/D conversion was called by the dither stripper method or the shared dither stripper method and dither drive method;
   c. setting an A/D conversion complete flag for the dither stripper method;
   d. driving the dither motor;
   e. storing an A/D value in a background register if the A/D conversion was called by the background method; and
   f. setting the A/D conversion complete flag for the background method.

24. The direct digital dither drive apparatus of claim 1 further including an A/D priority register, and a timing method to schedule either a dither only analog to digital conversion, shared analog to digital conversion or perform a background analog to digital conversion with a dither only flag, dither and stripper flag, background flag, where an active flag indicates the respective conversion should be done, the scheduling method comprising the steps of:
 a. setting a dither only flag in the A/D priority register if the dither only flag is active;
 b. setting a dither and stripper flag in the A/D priority register if the dither and striper flag is active and the dither only flag is inactive; and
 c. performing the background analog to digital conversion and storing the result of the background analog to digital conversion in a background A/D conversion register if the stripper conversion will happen within a predetermined window, the dither and stripper flag is inactive and the dither only flag is inactive.

25. The direct digital dither drive apparatus of claim 1 wherein the method of determining the system sample clock for a laser gyro dither stripping method comprises the steps of:
 a. initializing a counter;
 b. capturing a sample clock edge of an external sample clock and generating an interrupt;
 c. executing after the interrupt occurs the following steps;
 d. storing a count value for the current time;
 e. reading an old time from a memory previously stored;
 f. computing a delta time to be the old time minus the new time;
 g. setting up an A/D conversion in a high speed output logic means;
 h. setting the old time to equal the new time and then returning to step (b) to wait for a sample edge.

26. A direct digital dither drive method for a laser gyro having a dithered gyro block with a dither motor and dither pickoff, the direct digital dither drive method comprising the steps of:
 a. sensing the actual displacement of the gyro block;
 b. reading a reference displacement of the gyro block previously stored in a memory;
 c. compacting the difference between the reference displacement and the actual displacement;
 d. forming a digital drive signal by adding random noise of a predetermined distribution to the difference;
 e. converting the digital drive signal into a pulse width modulation signal; and
 f. direct driving the dither motor with the pulse width modulation signal.

27. The direct digital dither drive method of claim 26 wherein the error is gain adjusted by multiplying the error by a gain factor.

28. The direct digital dither drive method of claim 26 wherein the pulse width modulation signal is limited to prevent rollover.

29. The direct digital dither drive method of claim 26 wherein the reference displacement is dynamically adjusted.

30. The direct digital dither drive method of claim 26 wherein the reference displacement is corrected by a dither stripper gain adjustment.

31. The direct digital dither drive method of claim 26 wherein the reference displacement is corrected by a dither stripper gain adjustment and the reference displacement is dynamically adjusted.

32. A direct dither drive apparatus for a laser gyro having a dithered gyro block with a dither motor and dither pickoff, the direct dither drive comprising:
 a. a means for amplification connected to the dither pickoff having an analog dither signal output;
 b. means for converting the analog dither signal to a digital dither signal;
 c. a means for converting the digital dither signal into a digital count signal by multiplying the digital dither signal by a predetermined scale factor;
 d. a means for subtracting a reference displacement count from the digital count signal to generate a differential displacement signal;
 e. a means for injecting random noise into the differential displacement signal to generate a digital drive signal;
 f. a means for converting the digital drive signal into a pulse width modulated signal; and
 g. a means for driving the dither motor in response to the pulse width modulated signal.

33. The direct dither drive apparatus of claim 32 wherein the pulse width modulated signal is limited to prevent rollover.

34. The direct dither drive apparatus of claim 32 wherein the differential displacement signal is gain adjusted to the magnitude of the random noise.

35. The direct dither drive apparatus of claim 32 wherein the reference displacement is dynamically adjusted.

36. The direct dither drive apparatus of claim 32 wherein the reference displacement is corrected by a dither stripper gain adjustment.

37. The direct dither drive apparatus of claim 32 wherein the reference displacement is corrected by a dither stripper gain adjustment and the reference displacement is dynamically adjusted.

38. The direct dither drive of claim 32 wherein the random noise has a Gaussian distribution.

39. The direct dither drive of claim 32 wherein the random noise has a Normal distribution.

40. The direct dither drive apparatus of claim 32 further including a power supply which provides a power supply signal, the means for driving the dither motor comprising:
 a. low pass filtering means having an output for providing a filtered signal and an input connected to the pulse width modulated drive signal;
 b. a means for amplifying the filtered signal from the low pass filtering means having an amplified signal output wherein the amplifying means is coupled at an input to the output of the low pass filtering means; and
 c. the dither drive signal responds to the amplified signal output, wherein the driving means includes an active pull-up means including means for providing a dead band operating characteristic.

41. The direct dither drive apparatus of claim 40 wherein the active pull-up means substantially eliminates current spikes on the power supply signal so as to provide low power consumption.

42. The direct dither drive apparatus of claim 40 wherein the active pull-up means comprises:
 a. a first transistor means having a base, collector and emitter;
 b. a second transistor means having a base, collector and emitter wherein the collectors of the first and second transistor means are connected to a voltage source and the emitter of the first transistor means is connected to the base of the second transistor means in a Darlington configuration; and c. diode means connected at a first terminal to the emitter of the second transistor means and at a second terminal to the base of the first transistor means.

43. The direct dither drive apparatus of claim 32 wherein the means for driving the dither motor provides an output in the range of +150 to −150 volts in response to the pulse width modulation input ranging from 0% to 100% duty cycle.

44. The direct dither drive of claim 32 further including an analog to digital converter scheduling method wherein the laser gyro further includes a dither stripper sharing the means for analog to digital conversion, the analog to digital converter scheduling method comprising the steps of:

a. defining a dither stripping begin time and a dither stripping duration;
b. computing an expected strip time as being the dither stripping begin time plus the dither stripper duration;
c. building a window of predetermined time around the strip time; and
d. calculating whether or not the predetermined analog to digital conversion for the digital dither signal will occur within the window and if it does setting a flag to indicate that the stripper analog to digital conversion will be shared with the drive analog to digital conversion.

45. The direct dither drive of claim 44 wherein the dither stripping begin time includes an analog to digital conversion time.

46. The direct dither drive apparatus of claim 32 wherein the analog to digital conversions are phase compensated for time delays in analog signal propagation and digital signal processing.

47. The direct dither drive apparatus of claim 32 wherein the dither crosses a point of zero magnitude periodically every dither period and the analog to digital conversion of the digital drive signal occurs at one quarter of the way through the dither period called the 90° dither period sample time and three quarters of the way through the dither period called the 270° dither period sample time.

48. The direct dither drive of claim 47 wherein the method of determining the 90° and 270° dither period sample times comprises the steps of:

a. determining the time of the zero crossing of the dither and defining an interrupt time;
b. accessing a last interrupt time stored from the previous dither period;
c. determining a change in time by subtracting the interrupt time from the last interrupt time;
d. dividing the change in time by four to determine the quarter dither period;
e. calculating the 90° dither period sample time to equal the quarter dither period minus a predetermined phase lead time;
f. calculating the half dither period to be the twice the quarter dither period; and
g. calculating the 270° dither period sample time to equal the sum of the half dither period plus the 90° dither period sample time.

49. The direct dither drive of claim 48 wherein the predetermined phase lead time is equal to the change in time divided by a predetermined compensation constant.

50. The direct dither drive apparatus of claim 32 wherein the means for digital control is a microcontroller.

51. The direct dither drive apparatus of claim 32 wherein the means for amplification connected to the dither pickoff further comprises:

a. a first capacitor in parallel with the dither pickoff having a first terminal and second terminal;
b. a first resistor in parallel with the dither pickoff and first capacitor connected between the first terminal and second terminal;
c. a second capacitor connected to the first terminal and the input of a first amplifier to ac couple the dither pickoff wherein the second capacitor has a filtered dither output;
d. a first amplifier means for amplifying the filtered dither output having an analog dither pickoff output, a first input and second input wherein the first input is connected to the filtered dither output and the second input is connected to the analog dither pickoff output through a second resistor and fourth capacitor connected in parallel and wherein the second input is connected to ground through a third resistor; and
e. a second amplifier means for amplifying the analog dither pickoff output having a dither zero crossing detector output, a first input and second a second input wherein the first input is connected to the analog dither pickoff output and the second input is connected to the dither zero crossing detector output thought a fifth resistor and wherein the second input is also connected to ground through a sixth resistor.

52. The direct dither drive of claim 51 wherein a dither drive software interrupt is generated by the transition of the zero crossing detector output.

53. The direct dither drive of claim 52 wherein the frequency of the dither motor is calculated by the number of transitions of the zero crossing detector divided by the time duration of the transitions of the zero crossing detector.

54. The direct dither drive apparatus of claim 32 wherein the means for driving the dither motor further includes a high speed output logic means to drive a first dither leg with a first pulse width modulated signal and a second dither leg with a second pulse width modulated signal.

55. The direct dither drive apparatus of claim 32 wherein the means for converting the digital drive signal provides a first pulse width modulated dither drive signal and a second pulse width modulated dither drive signal, and wherein the means for driving the dither motor comprises:

a. a first transistor means with a first gate, first source and first drain wherein the first gate is connected to the first pulse width modulated dither drive signal and the first drain is connected to ground;
b. a second transistor means with a second gate, second source and second drain wherein the second gate is connected to the second pulse width modulated dither drive signal and the second drain is connected to ground;
c. a first induction means having a first coil with a first and second terminal and a second coil with a third and fourth terminal and a center terminal wherein the first terminal is connected to the dither drive signal, the second terminal is connected to ground, the center terminal is connected to a voltage supply means, the third terminal is connected to the first source and the fourth terminal is connected to the second source;

d. a first diode connected between the third terminal and center terminal; and e. a second diode connected between the fourth terminal and center terminal.

56. The direct dither drive of claim 32 wherein an A/D conversion has occurred and is arbitrated between a dither drive method, a dither stripper method and a background method, wherein the A/D conversion may also be shared by the dither drive method and dither stripper method, and wherein the arbitration method comprises the steps of:

a. determining whether the A/D conversion was called by the dither drive method, the dither stripper method, the shared dither drive method and the dither stripper method or the background method;

b. storing an A/D value in the dither stripper register if the A/D conversion was called by the dither stripper method or the shared dither stripper method and dither drive method;

c. setting an A/D conversion complete flag for the dither stripper method;

d. driving the dither motor;

e. storing an A/D value in a background register if the A/D conversion was called by the background method; and f. setting the A/D conversion complete flag for the background method.

57. The direct dither drive of claim 32 further including an A/D priority register, and a timing method to schedule either a dither only analog to digital conversion, shared analog to digital conversion or perform a background analog to digital conversion with a dither only flag, dither and stripper flag, background flag, where an active flag indicates the respective conversion should be done, the scheduling method comprising the steps of:

a. setting a dither only flag in the A/D priority register if the dither only flag is active;

b. setting a dither and stripper flag in the A/D priority register if the dither and striper flag is active and the dither only flag is inactive; and c. performing the background analog to digital conversion and storing the result of the background analog to digital conversion in a background A/D conversion register if the stripper conversion will happen within a predetermined window, the dither and stripper flag is inactive and the dither only flag is inactive.

58. The direct dither drive of claim 32 wherein the method of determining the system sample clock for a laser gyro dither drive method comprises the steps of:

a. initializing a counter;

b. capturing a sample clock edge of an external sample clock and generating an interrupt;

c. executing after the interrupt occurs the following steps;

d. storing a count value for the current time;

e. reading an old time from a memory previously stored;

f. computing a delta time to be the old time minus the new time;

g. setting up an A/D conversion in a high speed output logic device;

h. setting the old time to equal the new time and then returning to step (b) to wait for a sample edge.

59. A direct dither drive apparatus for a laser gyro having a dithered gyro block with a dither motor and dither pickoff, the direct dither drive comprising:

a. a means for amplification connected to the dither pickoff having an analog dither signal output;

b. a means for converting the analog dither signal to a digital dither signal;

c. a means for converting a count reference displacement signal into a digital volt reference displacement signal by multiplying the digital dither signal by a predetermined scale factor;

d. a means for subtracting a digital volt reference displacement signal from the digital dither signal to generate a differential displacement signal;

e. a means for injecting random noise into the differential displacement signal to generate a digital drive signal;

f. a means for converting the digital drive signal into a pulse width modulated signal; and g. a means for driving the dither motor in response to the pulse width modulated signal.

60. The direct dither drive apparatus of claim 59 wherein the means for driving the dither motor further includes a high speed output logic means to drive a first dither leg with a first pulse width modulated signal and a second dither leg with a second pulse width modulated signal.

61. The direct dither drive apparatus of claim 59 wherein the means for converting the digital drive signal provides a first pulse width modulated dither drive signal and a second pulse width modulated dither drive signal, and wherein the means for driving the dither motor comprises:

a. a first transistor means with a first gate, first source and first drain wherein the first gate is connected to the first pulse width modulated dither drive signal and the first drain is connected to ground;

b. a second transistor means with a second gate, second source and second drain wherein the second gate is connected to the second pulse width modulated dither drive signal and the second drain is connected to ground;

c. a first induction means having a first coil with a first and second terminal and a second coil with a third and fourth terminal and a center terminal wherein the first terminal is connected to the dither drive signal, the second terminal is connected to ground, the center terminal is connected to a voltage supply means, the third terminal is connected to the first source and the fourth terminal is connected to the second source;

d. a first diode connected between the third terminal and center terminal; and e. a second diode connected between the fourth terminal and center terminal.

62. A ring laser dither pickoff sensor comprising:

a. a first capacitor in parallel with the dither pickoff having a first terminal and second terminal;

b. a first resistor in parallel with the dither pickoff and first capacitor connected between the first terminal and second terminal;

c. a second capacitor connected to the first terminal and the input of a first amplifier to ac couple the dither pickoff wherein the second capacitor has a filtered dither output;

d. a first amplifier means for amplifying the filtered dither output having an analog dither pickoff output, a first input and second input wherein the first input is connected to the filtered dither output and the second input is connected to the analog dither pickoff output through a second resistor and fourth capacitor connected in parallel and wherein the second input is connected to ground through a third resistor; and e. a second amplifier means for amplifying the analog dither pickoff output having a dither zero crossing detector output, a first input and second a second input wherein the first input is connected to the analog dither pickoff output and the second input is connected to the dither zero crossing detector output thought a fifth resistor and wherein the second input is also connected to ground through a sixth resistor.

63. A direct digital dither drive apparatus for a laser gyro having a dithered gyro block with a dither motor having a dither zero crossing detector, dither pickoff, read out counter, and a system sample strobe, the direct digital dither drive comprising:

a. an edge triggered register means for latching the read out counter value on the system sample strobe having a latched read out counter output;

b. a first analog to digital conversion means connected to the dither pickoff for generating a stripper sample enabled by the system sample strobe;

c. a second analog to digital conversion means connected to the dither pickoff for generating a dither drive sample enabled by the dither zero crossing detector; and d. a direct digital control means for controlling the dither motor connected to the stripper sample, and drive sample wherein the direct digital control means provides a direct digital drive signal.

64. The direct digital dither drive apparatus of claim 63 also comprising a third analog to digital conversion means connected to the a plurality of multiplexed background signals for generating a background sample enabled by the direct digital dither control means.

* * * * *